(12) United States Patent
Dohno

(10) Patent No.: US 12,174,625 B2
(45) Date of Patent: Dec. 24, 2024

(54) NON-TRANSITORY COMPUTER READABLE MEDIUM STORING PROGRAM FOR MANIPULATING MANIPULATION TARGET DEVICE

(71) Applicant: ALVION Inc., Osaka (JP)

(72) Inventor: Kuninori Dohno, Osaka (JP)

(73) Assignee: ALVION Inc., Osaka (JP)

( * ) Notice: Subject to any disclaimer, the term of this patent is extended or adjusted under 35 U.S.C. 154(b) by 0 days.

(21) Appl. No.: 18/229,118

(22) Filed: Aug. 1, 2023

(65) Prior Publication Data

US 2024/0036568 A1 Feb. 1, 2024

(30) Foreign Application Priority Data

Aug. 1, 2022 (JP) ................................ 2022-122408

(51) Int. Cl.
*G05D 1/00* (2024.01)
*G06F 3/0481* (2022.01)
(Continued)

(52) U.S. Cl.
CPC ......... *G05D 1/0016* (2013.01); *G06F 3/0481* (2013.01); *G06F 3/04842* (2013.01); *G06F 3/0488* (2013.01); *G06F 2203/04803* (2013.01)

(58) Field of Classification Search
CPC . G05D 1/0016; G06F 3/0481; G06F 3/04842; G06F 3/0488; G06F 2203/04803
See application file for complete search history.

(56) References Cited

U.S. PATENT DOCUMENTS 9,361,521 B1 * 6/2016 McLean ............... G06F 3/04847
9,682,761 B2 * 6/2017 Okuda ................. G01C 21/203
(Continued)

FOREIGN PATENT DOCUMENTS

EP 2541385 A2 * 1/2013 ........... G06F 3/0488
JP 2014155129 A * 8/2014 ........... G05D 1/0016
(Continued)

OTHER PUBLICATIONS

Translation of WO-2020220154-A1, 13 pages (Year: 2020).*
(Continued)

*Primary Examiner* — Dale W Hilgendorf
(74) *Attorney, Agent, or Firm* — K&L Gates LLP; Brian J. Novak; Giorgios N. Kefallinos

(57) ABSTRACT

A program manipulates a device compatible with all sizes of devices such as a touch panel used for manipulation. The program is for manipulating a manipulation target device. The program causes a computer, that includes a display device that accepts a contact manipulation by an instruction object, to generate manipulation information, for manipulating the manipulation target device on the basis of a contact manipulation by the instruction object on the display device, to hold the manipulation information even when the instruction object is not touching the display device, and to manipulate the manipulation target device by transmitting the held manipulation information to the manipulation target device. The computer restarts generation of the manipulation information on the basis of the held current manipulation information when a contact on the display device is made again.

13 Claims, 32 Drawing Sheets

(51) Int. Cl.
*G06F 3/04842* (2022.01)
*G06F 3/0488* (2022.01)

(56) References Cited

U.S. PATENT DOCUMENTS

| | | | | |
|---|---|---|---|---|
| 9,918,002 | B2* | 3/2018 | Kwon | G05D 1/0016 |
| 2011/0021272 | A1* | 1/2011 | Grant | A63F 13/10 |
| | | | | 463/30 |
| 2016/0070527 | A1* | 3/2016 | Ricci | G06Q 10/109 |
| | | | | 715/716 |
| 2016/0360087 | A1* | 12/2016 | Kwon | G05D 1/0016 |
| 2017/0102699 | A1* | 4/2017 | Anderson | G05D 1/0016 |
| 2017/0108857 | A1* | 4/2017 | Line | G05D 1/0016 |
| 2019/0250601 | A1* | 8/2019 | Donahoe | G05D 1/0016 |
| 2022/0075364 | A1* | 3/2022 | Summer | G05D 1/0223 |
| 2024/0199225 | A1* | 6/2024 | Cole | B64D 11/0646 |

FOREIGN PATENT DOCUMENTS

| | | | | | |
|---|---|---|---|---|---|
| JP | 2016225872 | A | * | 12/2016 | G06F 3/0488 |
| JP | 2017-119508 | A | | 7/2017 | |
| JP | 2017-123148 | A | | 7/2017 | |
| JP | 6470112 | B2 | | 2/2019 | |
| JP | 6685742 | B2 | | 4/2020 | |
| JP | 2021012612 | A | * | 2/2021 | G06F 3/0488 |
| JP | 6855616 | B2 | | 4/2021 | |
| WO | WO-2020220154 | A1 | * | 11/2020 | G06F 3/0488 |

OTHER PUBLICATIONS

Translation of JP-2021012612-A, 18 pages (Year: 2021).*
Translation of JP-2014155129-A, 16 pages (Year: 2014).*
Translation of JP-2016225872-A, 5 pages (Year: 2016).*

* cited by examiner

F I G. 2
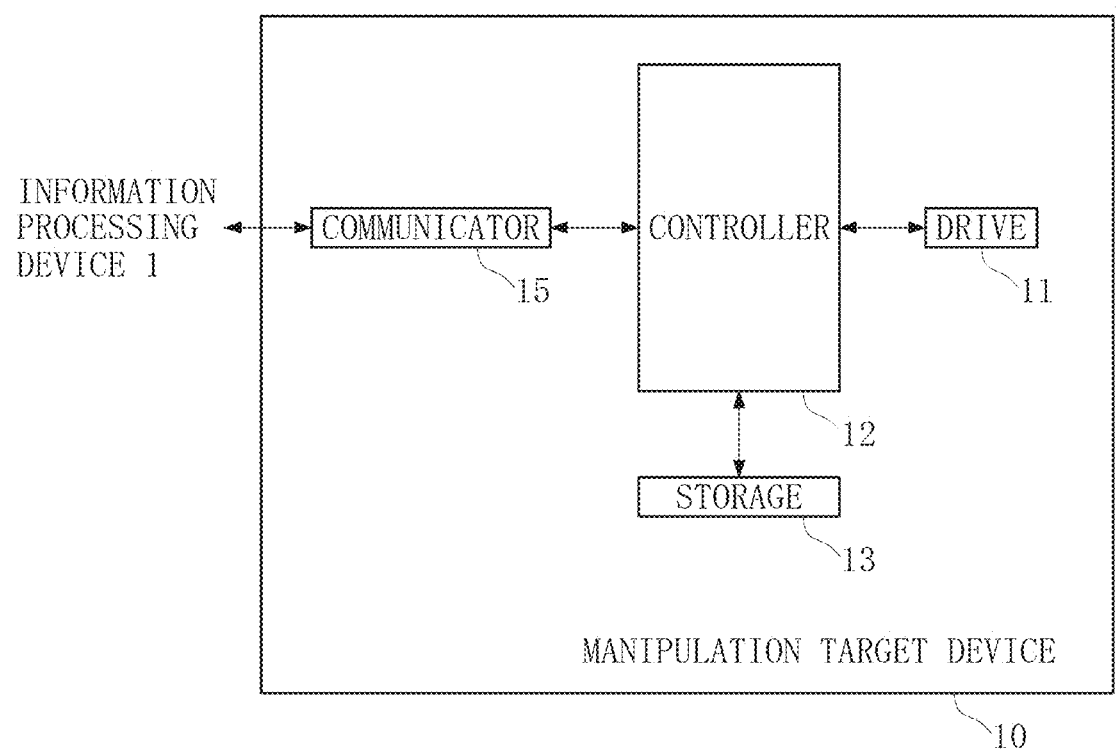

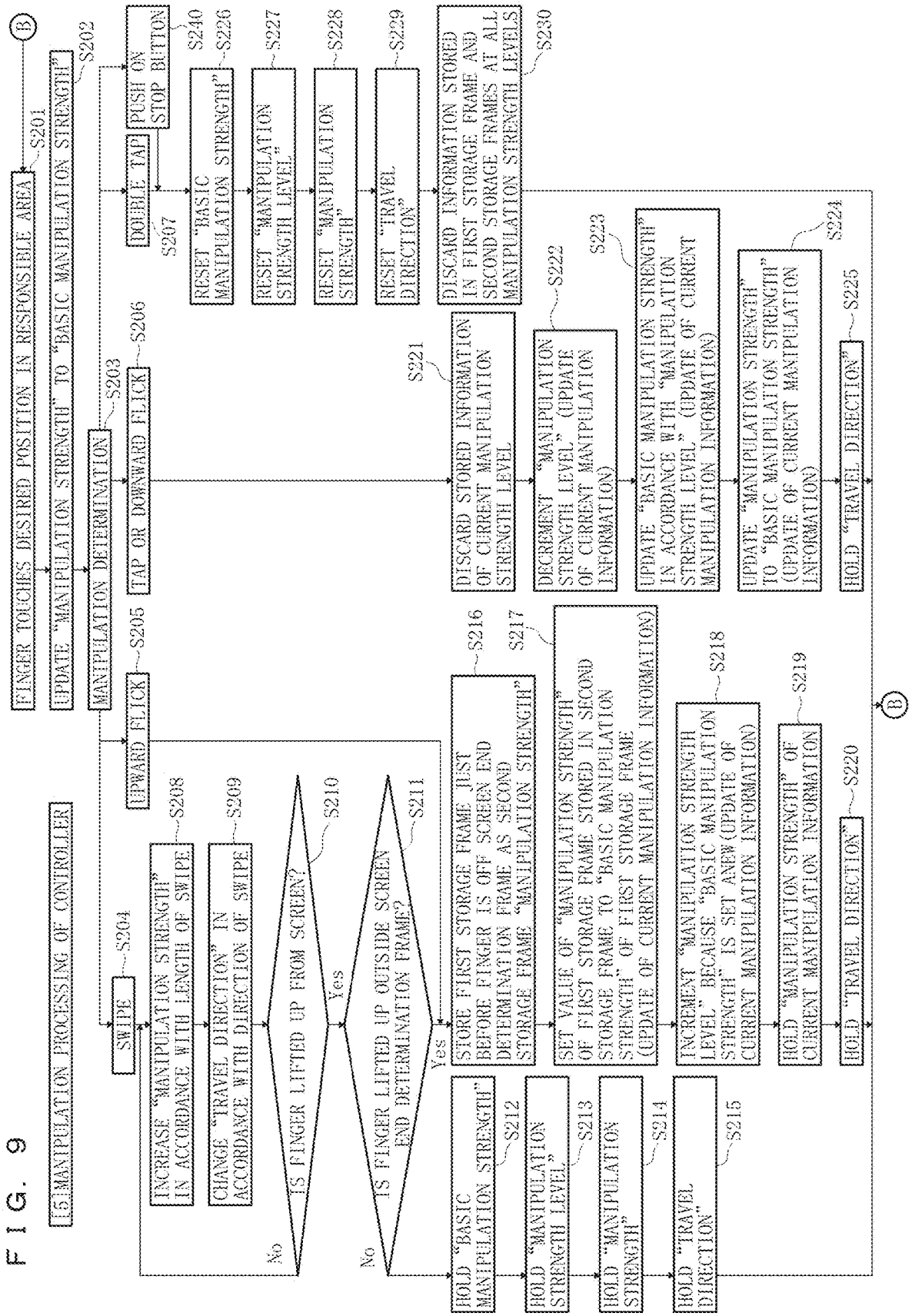

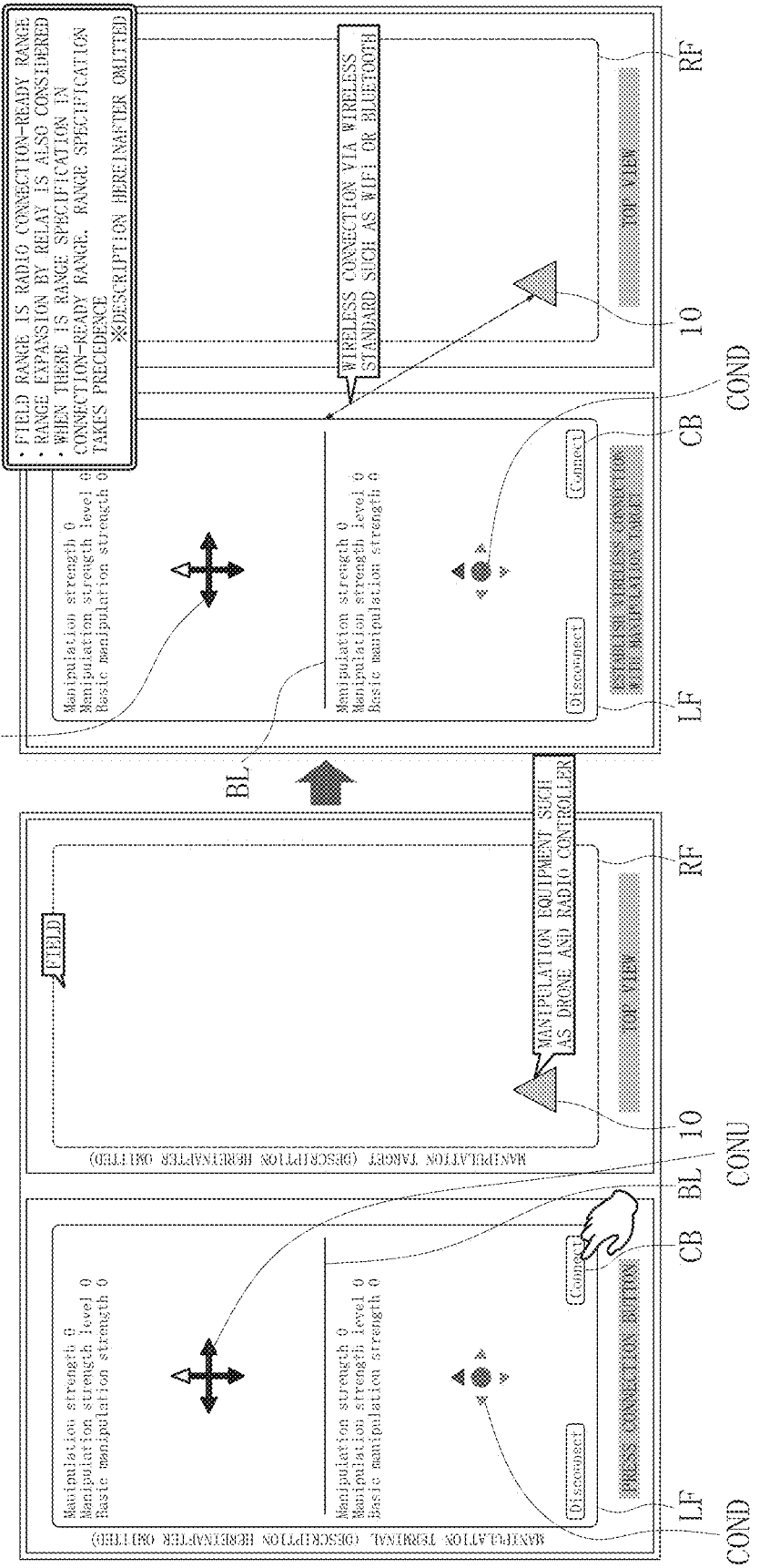

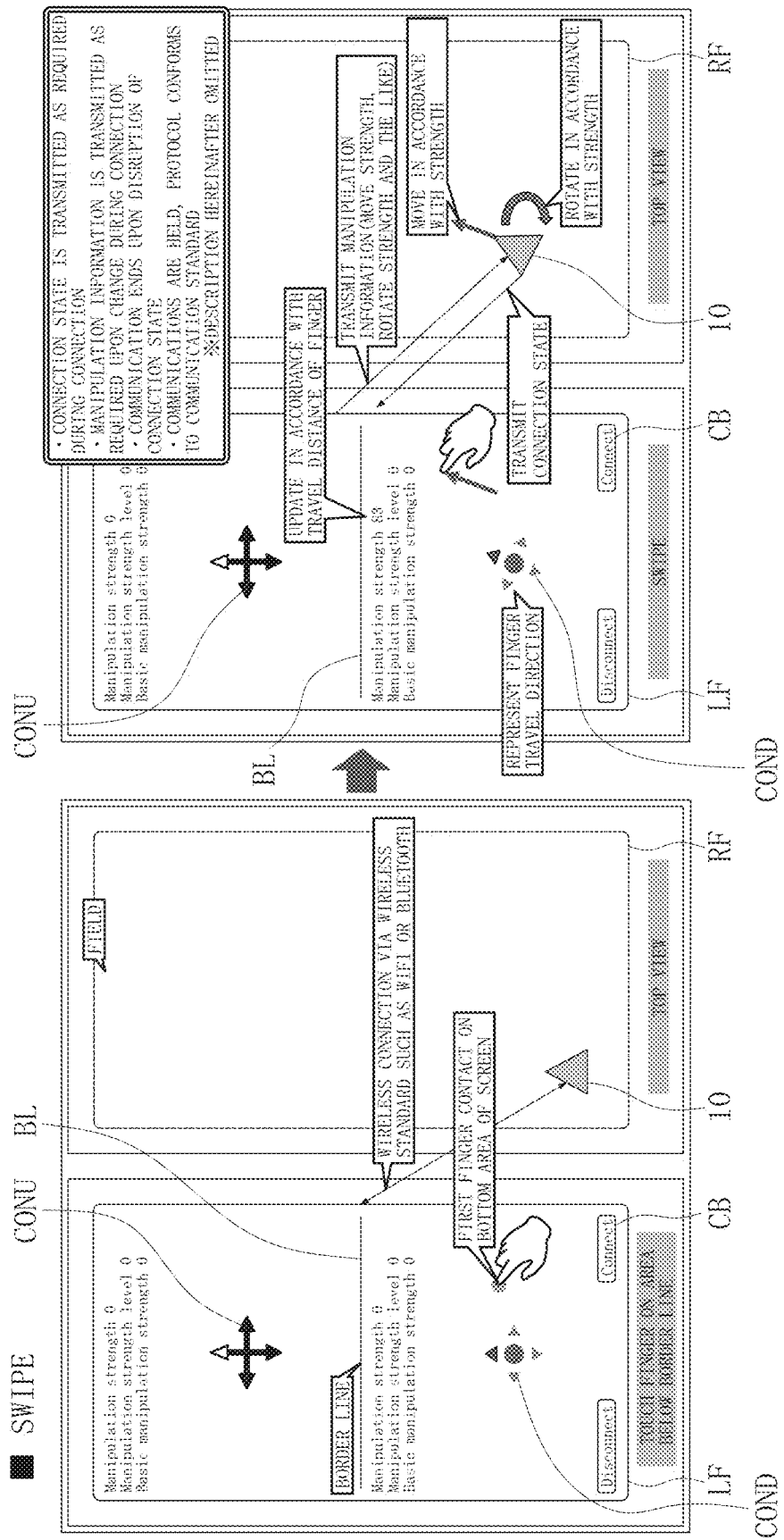

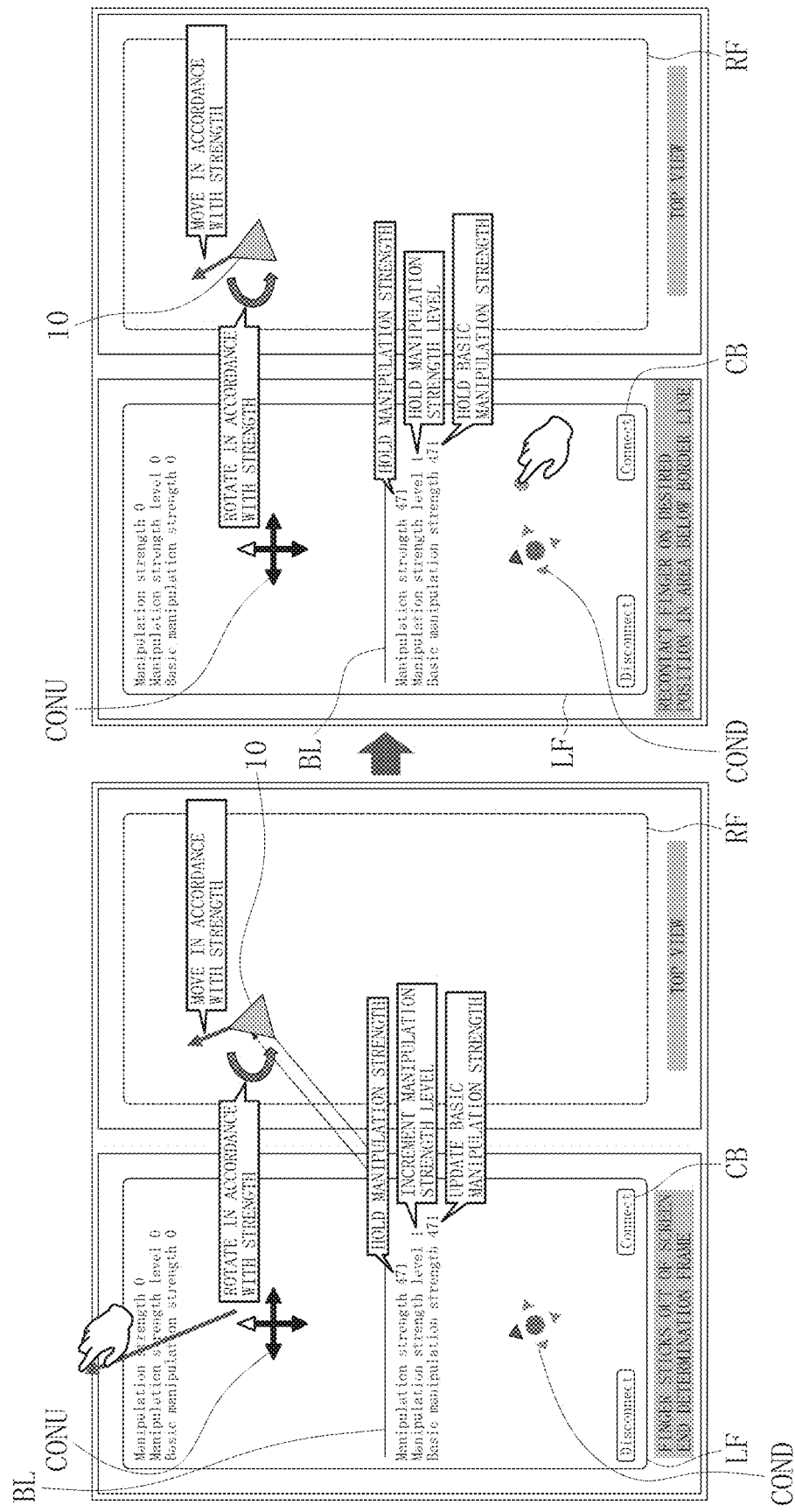

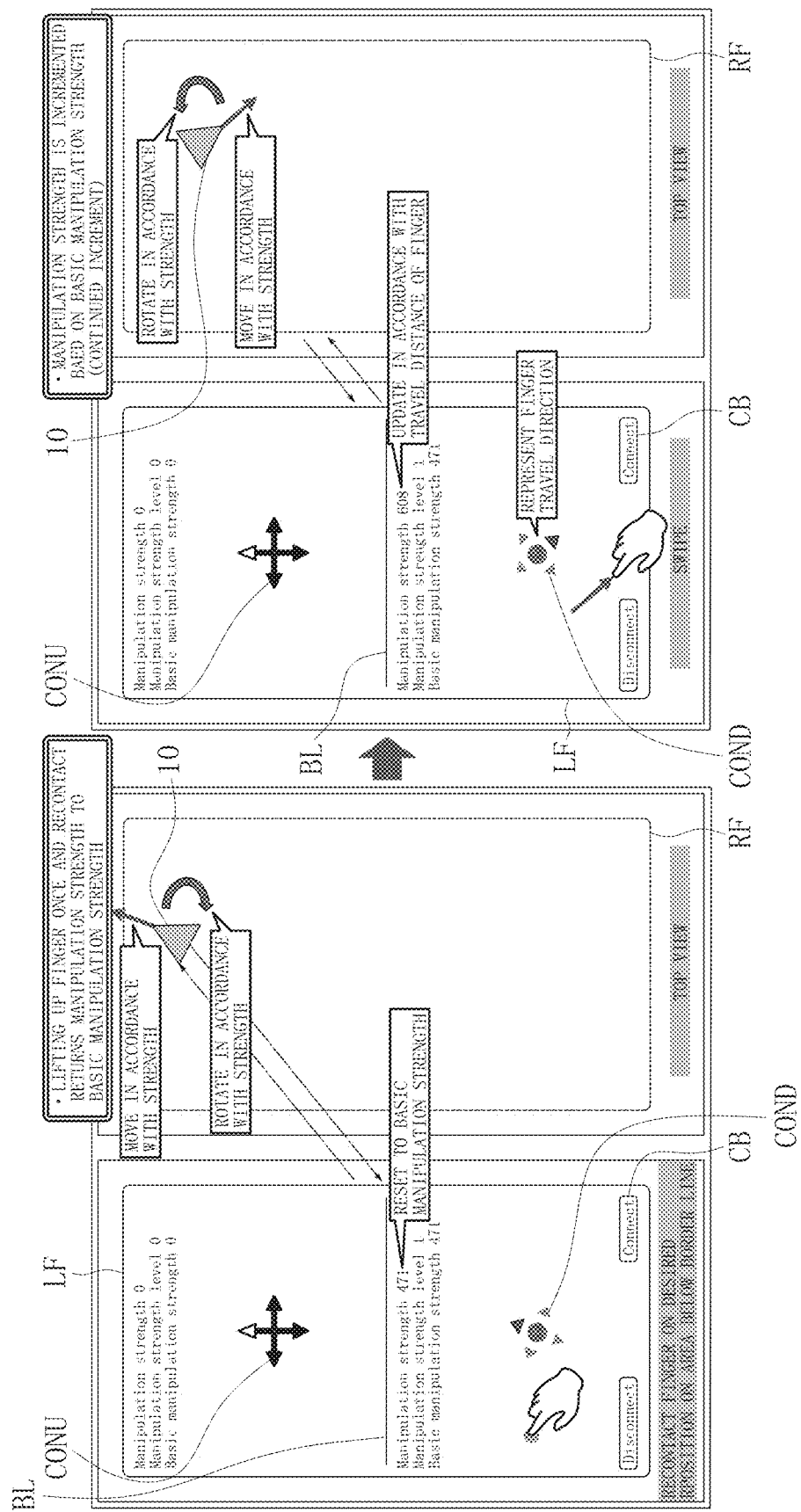

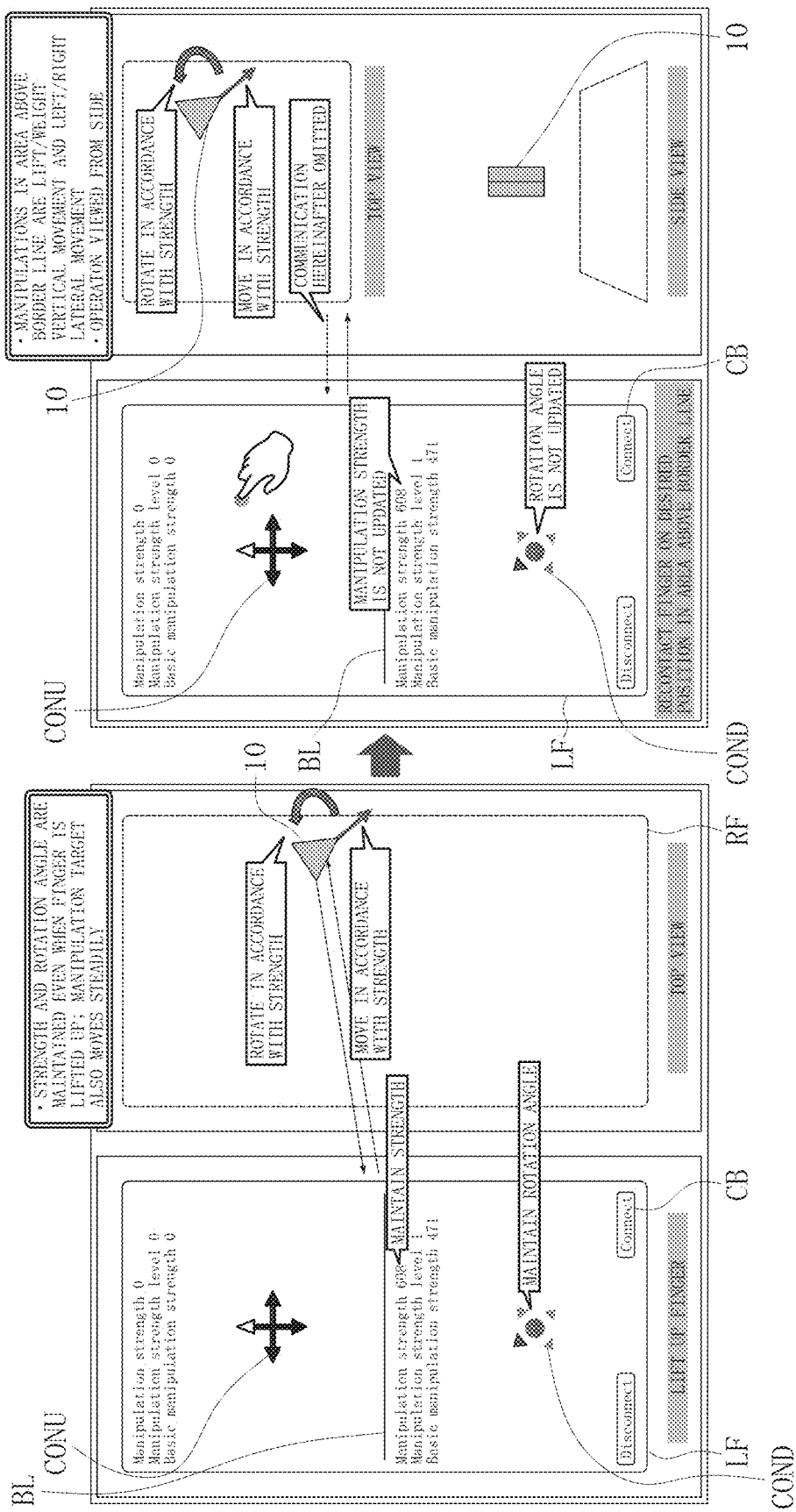

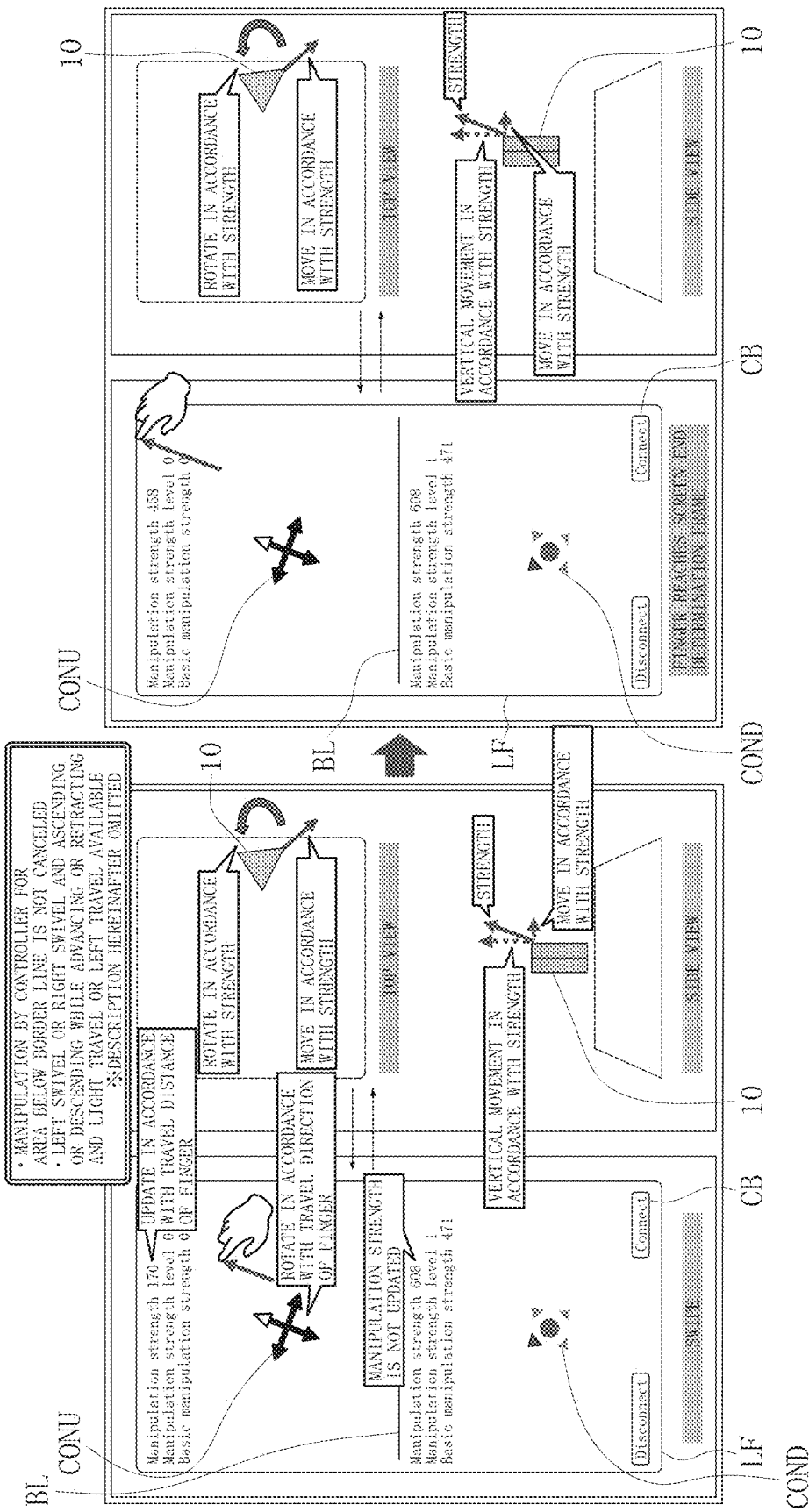

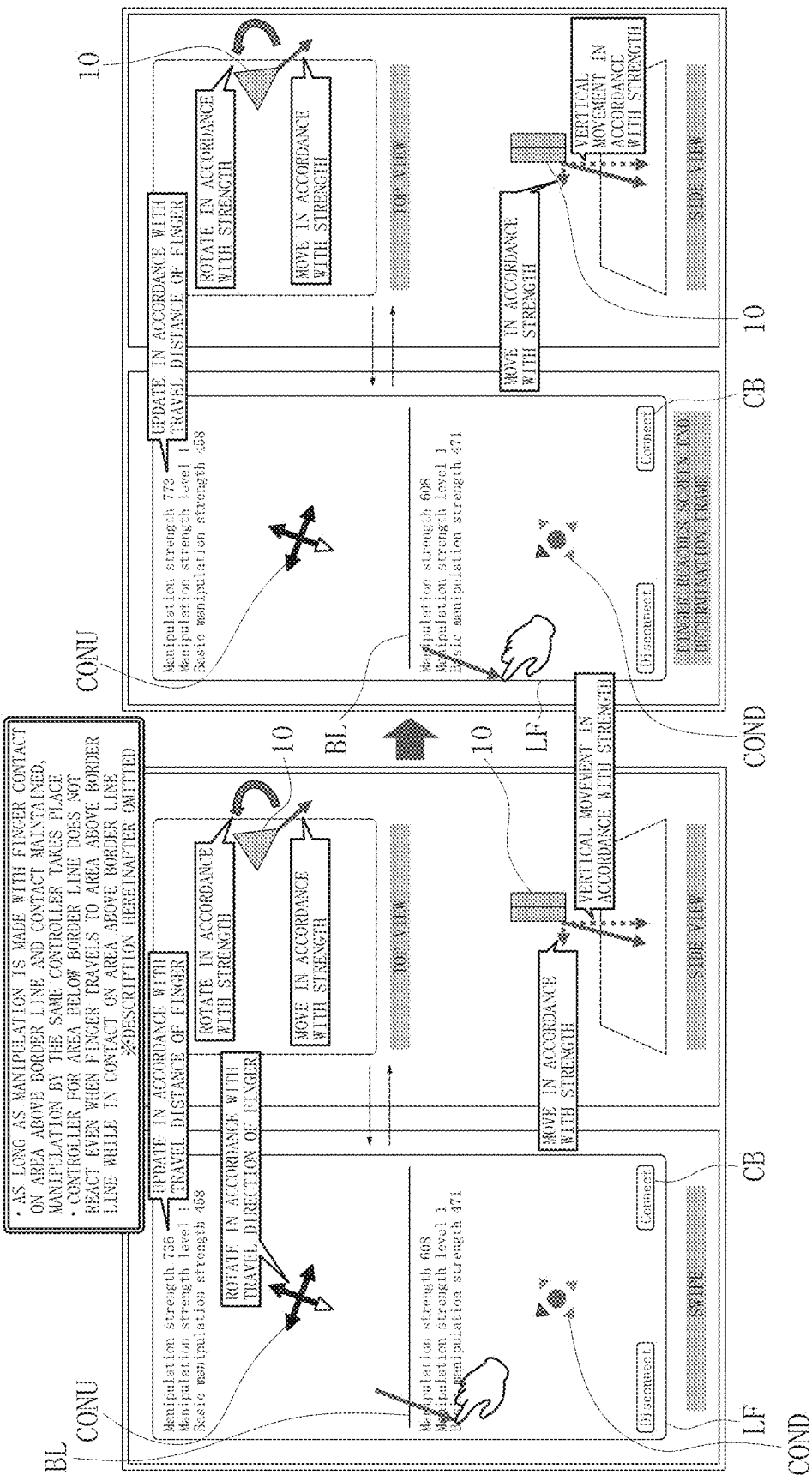

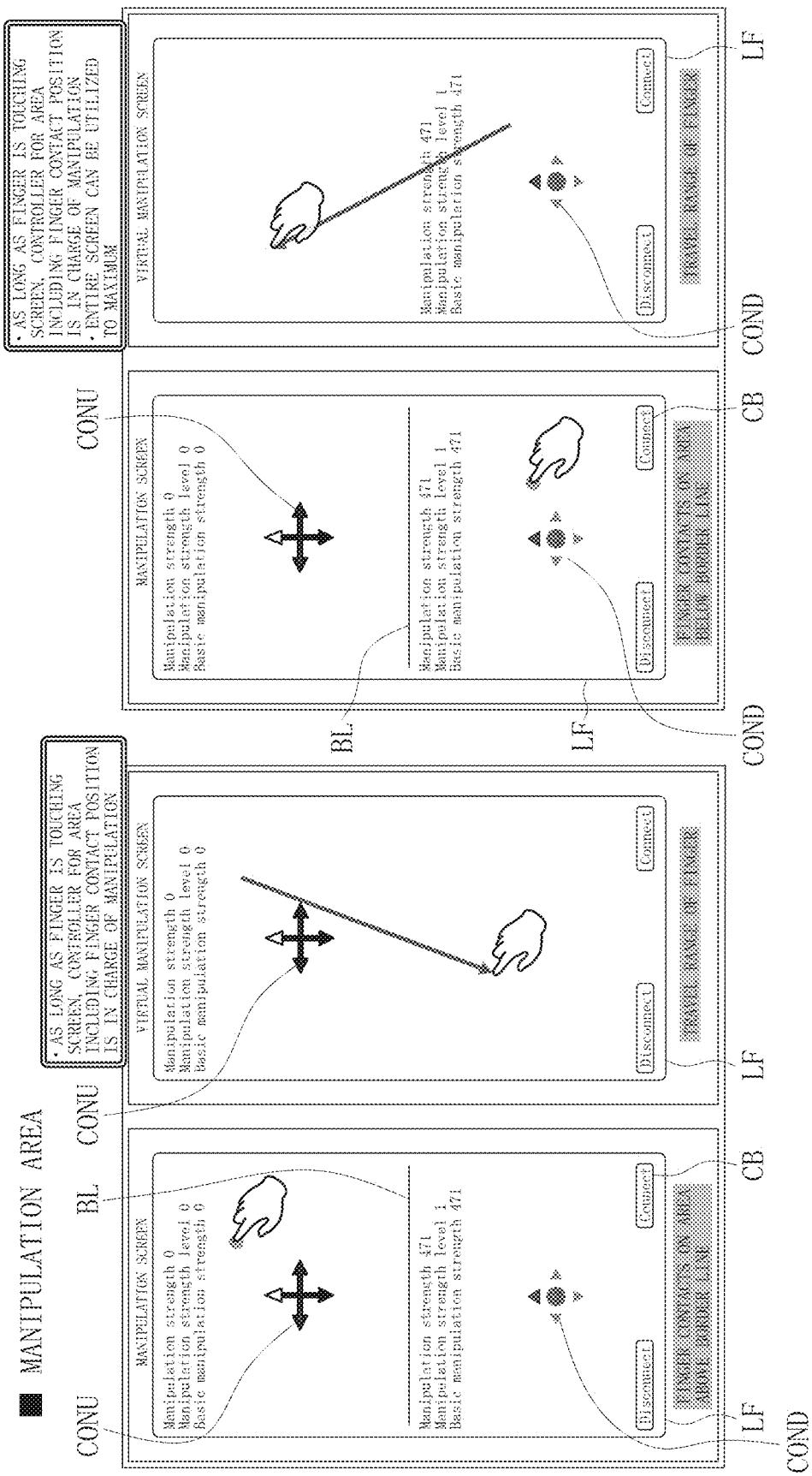

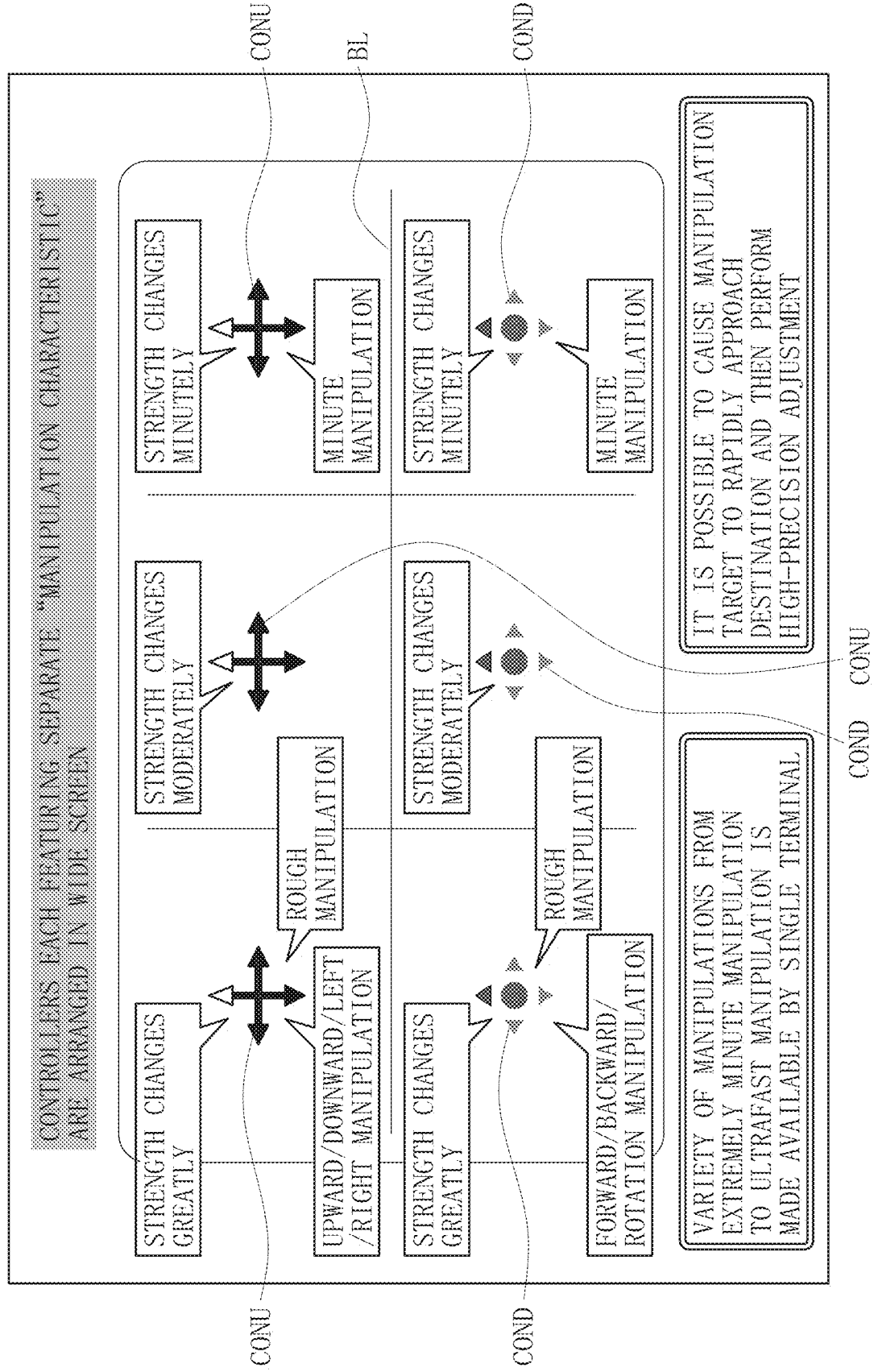

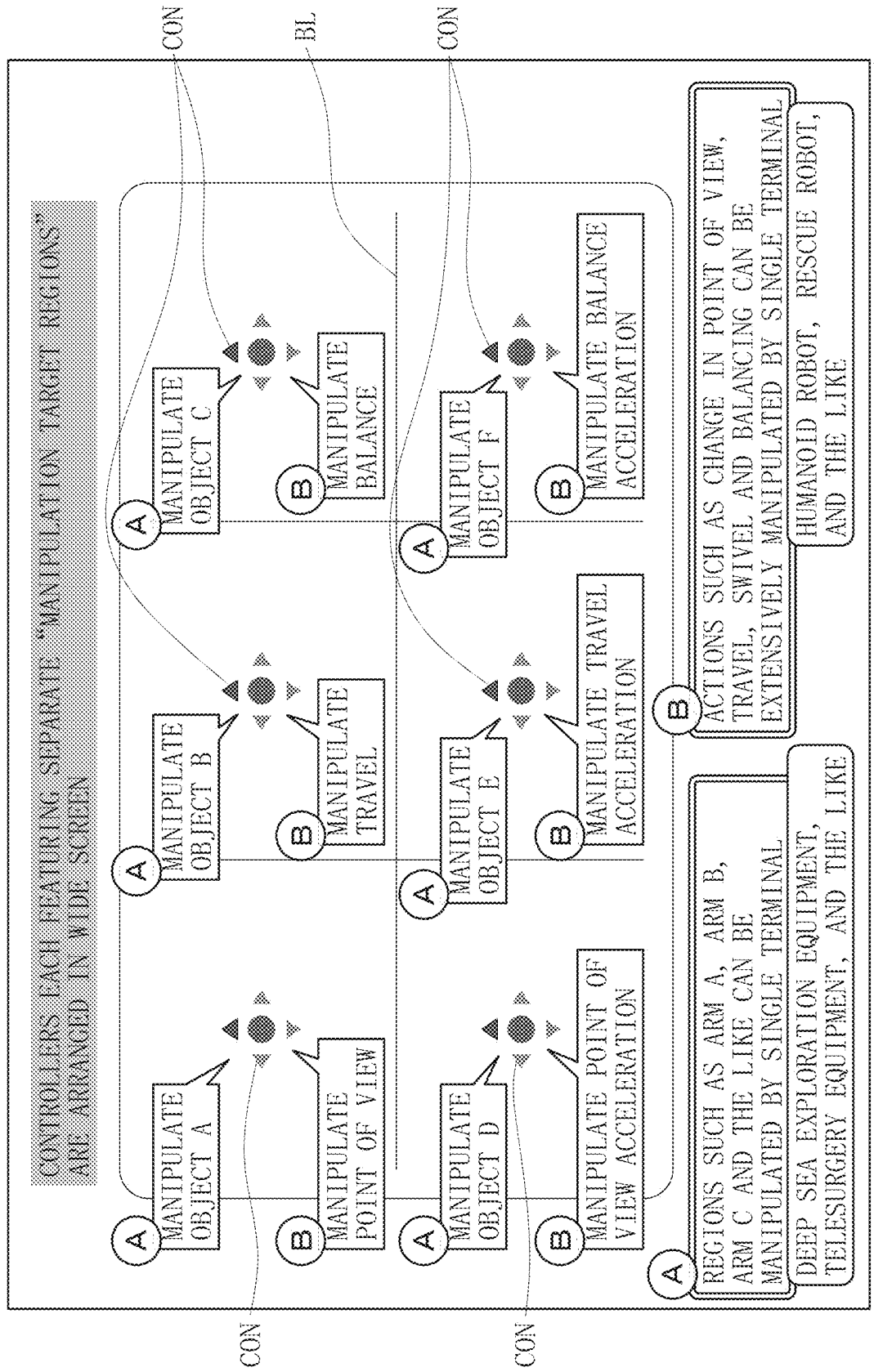

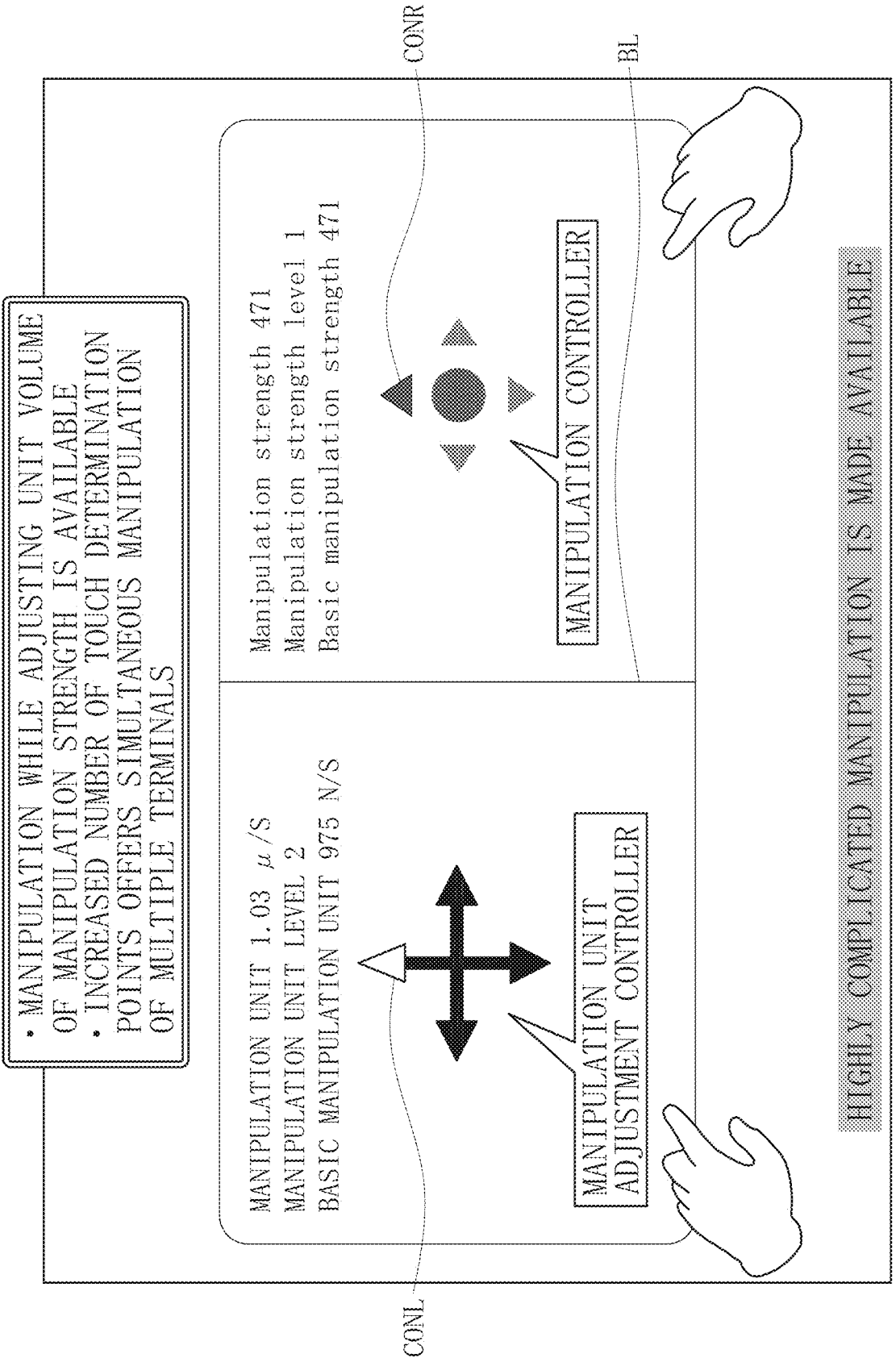

NON-TRANSITORY COMPUTER READABLE MEDIUM STORING PROGRAM FOR MANIPULATING MANIPULATION TARGET DEVICE

CROSS-REFERENCE TO RELATED APPLICATIONS

This application claims the benefit of Japanese Patent Application No. 2022-122408, filed on Aug. 1, 2022, the entire disclosure of which is incorporated by reference herein.

FIELD OF THE INVENTION

The present disclosure relates generally to a program for manipulating a manipulation target device, and more particularly, to a program for manipulating a manipulation target device by way of a contact manipulation on a display device.

BACKGROUND OF THE INVENTION

When manipulating a manipulation target device such as a drone, there have occurred cases where a manipulation target device is manipulated by using a touch panel as described in Patent Literature 1 to 5, Japanese Patent No. 6855616, Japanese Patent No. 6685742, Japanese Patent No. 6470112, Unexamined Japanese Patent Application Publication No. 2017-123148, and Unexamined Japanese Patent Application Publication No. 2021-12612.

A device described in any one of Patent Literature 1 to 5 requires a touch panel including a relatively large touch screen for manipulation, and only limited manipulation procedures may be used. On these devices, it is necessary to keep a finger touched on the screen. When a small-sized touch panel is used, it is difficult to keep a finger touched on the screen.

An objective of the present disclosure is to provide a general-purpose program for manipulating a device.

SUMMARY OF THE INVENTION

To achieve the objective, the program, according to the present disclosure, is for manipulating a manipulation target device including a drive device. The program causes a computer that is to be connected to a display device that accepts a contact manipulation (operation) by an instruction object or that includes the display device, to function as: manipulation information generating and holding means for generating manipulation information for manipulation of the manipulation target device on basis of a contact manipulation by the instruction object on the display device, and holding the manipulation information even when the instruction object is not touching the display device, and manipulation means for manipulating the manipulation target device by transmitting the held manipulation information to the manipulation target device.

The "contact manipulation" is not limited to the physical contact of the instruction object with the display device at a distance of zero. In this specification, "contact" includes a state in which the instruction object is close enough to the display device that the user's manipulation can be specified by detecting the movement of the instruction object. Moreover, "not in contact" includes a state in which the instruction object is separated from the display device to the extent that the movement of the instruction object and the user's operation cannot be specified. In other words, the instruction object is in contact when it is within a spatial range set in advance with respect to the display screen, and separated when it is outside the spatial range. Further, the display device is not limited to a tangible device that has a substance and can actually be touched. It may be a display device that is virtually synthesized and displayed in space, such as a so-called virtual input device. In this case, it can be determined that the instruction object is in contact when it is within a spatial range set in advance based on the position of the input screen or operation screen that is virtually displayed, and separated when it is outside the spatial range. For this reason, the "contact manipulations using the instruction object" in the present disclosure is substantially equivalent to "manipulation using the instruction object" to the display device.

Preferably, the manipulation information generating and holding means may determine whether or not a contact on the display device is lost during a swipe, when determining that a contact on the display device is lost during a swipe, holds current manipulation information on the manipulation target device.

The manipulation means transmits the held current manipulation information to the manipulation target device and manipulates the manipulation target device even in a state where a contact on the display device is not made. The manipulation information generating and holding means may restarts generation of the manipulation information on basis of the held current manipulation information when a contact on the display device is made again.

In one embodiment, the program may further cause the computer to function as virtual controller image display means for causing the display device to display an image of a virtual controller by setting an area for performing a manipulation on the manipulation target device as a manipulation area and a predetermined range on the display device as a screen end determination frame, in a display screen of the display device.

The manipulation information generating and holding means may generate the manipulation information until the screen end determination frame is reached even when a manipulation by the instruction object starts from the manipulation area and sticks out of the manipulation area. The screen end determination frame is not limit to a frame defining the end of the display device, but a frame defining an area or range set on the screen.

In one embodiment, the program may further cause the computer to function as virtual controller image display means for causing the display device to display an image of a virtual controller at least by separating the image into a first area for performing a first manipulation on the manipulation target device and a second area for performing a second manipulation on the manipulation target device.

The manipulation information generating and holding means may generate manipulation information for the first manipulation on basis of a manipulation by the instruction object in the first area and generates manipulation information for the second manipulation on basis of a manipulation by the instruction object in the second area.

In one embodiment, the manipulation information generating and holding means may generate, as a manipulation in the first area, the manipulation information even when a manipulation by the instruction object starts from the first area and the manipulation by the instruction object sticks out of the first area and reaches the second area.

In one embodiment, the manipulation information generating and holding means, when determining that a contact of the instruction object is lost outside a predetermined screen end determination frame, may update the current manipulation information as manipulation information of one-level higher strength.

The manipulation means may manipulate the manipulation target device on basis of the updated current manipulation information in a state where a contact on the manipulation inputter is not made, and the manipulation means may restart, when a contact on the display device is made again, a manipulation of the manipulation target device on basis of the current manipulation information held as manipulation information in an area to which a contact position belongs.

In one embodiment, the manipulation information generating and holding means may be, when determining that a contact is lost outside a predetermined screen end determination frame, and when a travel direction upon the loss of contact is a predetermined downward direction, capable of updating, as manipulation information of one-level lower strength.

The current manipulation information generated on basis of an instruction object whose contact is lost, the manipulation means may manipulate the manipulation target device on basis of the updated current manipulation information, in a state where a contact on the display device is not made.

The manipulation means may restart, when a contact on the display device is made again, a manipulation of the manipulation target device on basis of the current manipulation information held as manipulation information in an area to which a contact position belongs.

In one embodiment, the program may further cause the computer to function as upward flick determination means for determining whether or not a manipulation on the display device is a predetermined upward flick.

The manipulation information generating and holding means, when determining a flick in the predetermined upward direction, may update the current manipulation information as manipulation information of one-level higher strength.

The manipulation means may manipulate the manipulation target device on basis of the updated current manipulation information in a state where a contact on the manipulation inputter is not made.

The manipulation means restarts, when a contact on the manipulation inputter is made again, a manipulation of the manipulation target device on basis of the current manipulation information held as manipulation information in an area to which a contact position belongs.

In one embodiments, the program may further cause the computer to function as tap or downward flick determination means for determining whether or not a manipulation on the display device is a tap or a predetermined downward flick.

The manipulation information generating and holding means, when determining a tap or a flick in the predetermined downward direction, may update the current manipulation information generated on basis of an instruction object whose contact is lost as manipulation information of one-level lower strength.

The manipulation means may manipulate the manipulation target device on basis of the updated current manipulation information in a state where a contact on the manipulation inputter is not made, and the manipulation means may restarts.

When a contact on the manipulation inputter is made again, a manipulation of the manipulation target device on basis of the current manipulation information held as manipulation information in an area to which a contact position belongs.

In one embodiment, the program may further cause the computer to function as double tap determination means for determining whether or not a manipulation on the display device is a double tap.

The manipulation information generating and holding means, when determining a double tap, discards information held as manipulation information in an area to which a contact position belongs.

The manipulation means may perform a manipulation to stop a travel that belongs to a contact area on the manipulation target device.

In one embodiment, the program may further cause the computer to function as stop button determination means for determining whether a manipulation on the display device is a press of the stop button.

The manipulation information generating and holding means, when determining a press of the stop button, executes a stop instruction in a predetermined area, and discards held information that belongs to respective areas.

The manipulation means performs a manipulation to stop a travel that belongs to a predetermined area. Or when all areas are predetermined, performs a manipulation to stop the manipulation target device or to cause the manipulation target device to wait on a spot where manipulation target device is located.

In one embodiment, the manipulation information generating and holding means may generate the manipulation information on basis of a two-dimensional vector of a swipe by the instruction object on the display device.

The manipulation information generating and holding means may generates the manipulation information on basis of an x component and a y component of the two-dimensional vector.

When the manipulation target device is a drone, the manipulation information generating and holding means may generate the manipulation information so that a direction and a strength of two manipulations out of rudder, elevator, aileron and throttle are indicated by the x component and the y component.

When the manipulation target device is a drone, the manipulation information generating and holding means may generate the manipulation information so that a direction and a strength of rudder and elevator are indicated by the x component and the y component.

When the manipulation target device is a drone, the manipulation information generating and holding means may generates the manipulation information so that a direction and a strength of aileron and throttle are indicated by the x component and the y component.

The program may further cause the computer to function as virtual controller image display means for displaying, when the manipulation target device is a drone, an image of a virtual controller on the display device by separating the image into a first area for performing two manipulations out of rudder, elevator, aileron and throttle, and a second area for performing the two manipulations except the two manipulations in the first area.

The manipulation information generating and holding means generates manipulation information in the first area on basis of a swipe manipulation by the instruction object in the first area, and generates manipulation information in the second area on basis of a swipe manipulation by the instruction object in the second area.

According to the disclosure, the generated manipulation information is held, and the manipulation target device is manipulated based on the held manipulation information even when the instruction object is not in contact with the display device. In other words, even if the instruction object does not perform any manipulation using the display device, the manipulation target device is manipulated based on the held manipulation information. This enables manipulation using software, eliminating the need for dedicated manipulation hardware, and providing a highly versatile manipulation program.

Further, since manipulation is possible even when the instruction object is not in contact with the display device, there is no need to keep the instruction object in contact with the display device for manipulation. In other words, it is not necessary to continue to manipulate the display device with the instruction object. Therefore, even the size of the display device is small, the manipulation target device can be easily manipulated or operated. It mean that a program that can be manipulated regardless of the size of the display device is provided.

By setting the manipulation area and the screen edge determination frame, and generating the manipulation information even if the instruction object sticks out of the manipulation area and until the instruction object reaches the screen edge determination frame, even if the manipulation area to start the manipulation is small, it is possible to use the entire area in the screen edge determination frame for the manipulation.

Therefore, not only one virtual controller image, but also a plurality of virtual controller images can be appropriately arranged to enable manipulations such as using the entire screen, and various manipulation patterns can be provided.

By dividing a display screen into a first area and a second area, arranging a virtual controller image in each of the first area and the second area, and separating a first manipulation in the first area and a second manipulation in the second area to generate the manipulation information, various manipulation patterns can be provided.

Even if the manipulation of the instruction object starts from the first area, sticks out from the first area, and reaches the second area, if the manipulation information is generated as the manipulation in the first area, the first manipulation is possible with using the screen widely.

During swiping, even if the instruction object is removed outside the screen edge judgment frame, the strength of the swipe will be increased to the next level and the manipulation of the manipulation target device will be continued. When the indictor recontacts, it is possible that the manipulation restarts from the next level.

During swiping, if the instruction object moves downward and leaves the screen edge judgment frame, the strength will be one step lower and the manipulation of the manipulation target device will continue. And when it recontacts, it is possible to continue the "manipulation strength" from one level lower.

When a predetermined upward flick is performed, the strength becomes one step higher and the manipulation of the manipulation target device is continued, and when the instruction object recontacts, the manipulation can be continued from the strength one step higher.

When a tap or a predetermined downward flick is performed, the strength becomes one step lower and display of the movement of the manipulation target device continues. When the instruction object recontacts, the manipulation can be continued from the strength one step lower.

When double-tapping or pressing the stop button, it is possible to stop the manipulation target device or make it stand by on a spot.

By generating manipulation information based on the swipe two-dimensional vector, it is possible to generate accurate manipulation information.

By generating manipulation information based on the x and y components of the two-dimensional vector, it is possible to manipulate or operate a drone, for example. That is, rudder, elevator, aileron, and throttle direction and strength can be determined by the x and y components.

By providing the images of the virtual controls in the first area and the second area to control the rudder, elevator, aileron, and throttle, it is possible to arrange images of the virtual controllers for manipulating the drone on the display device.

These and other objects, features, aspects and effects of the present invention will become more apparent from the following detailed description in conjunction with the accompanying drawings.

BRIEF DESCRIPTION OF DRAWINGS

A more complete understanding of this application can be obtained when the following detailed description is considered in conjunction with the following drawings, in which:

FIG. 2 is a block diagram illustrating a functional configuration of a manipulation target device according to one embodiment of the present disclosure;

FIG. 9 is a flowchart illustrating manipulation processing of a controller in the information processing device;

FIG. 10 explains display examples of a screen assumed when connecting to the manipulation target device;

FIGS. 11A to 11J explain display examples the screen upon a swipe;

FIG. 16 explains manipulation areas set on the screen;

FIGS. 17A to 17E explain application examples of the disclosure; and

DETAILED DESCRIPTION OF THE INVENTION

Figure 1:
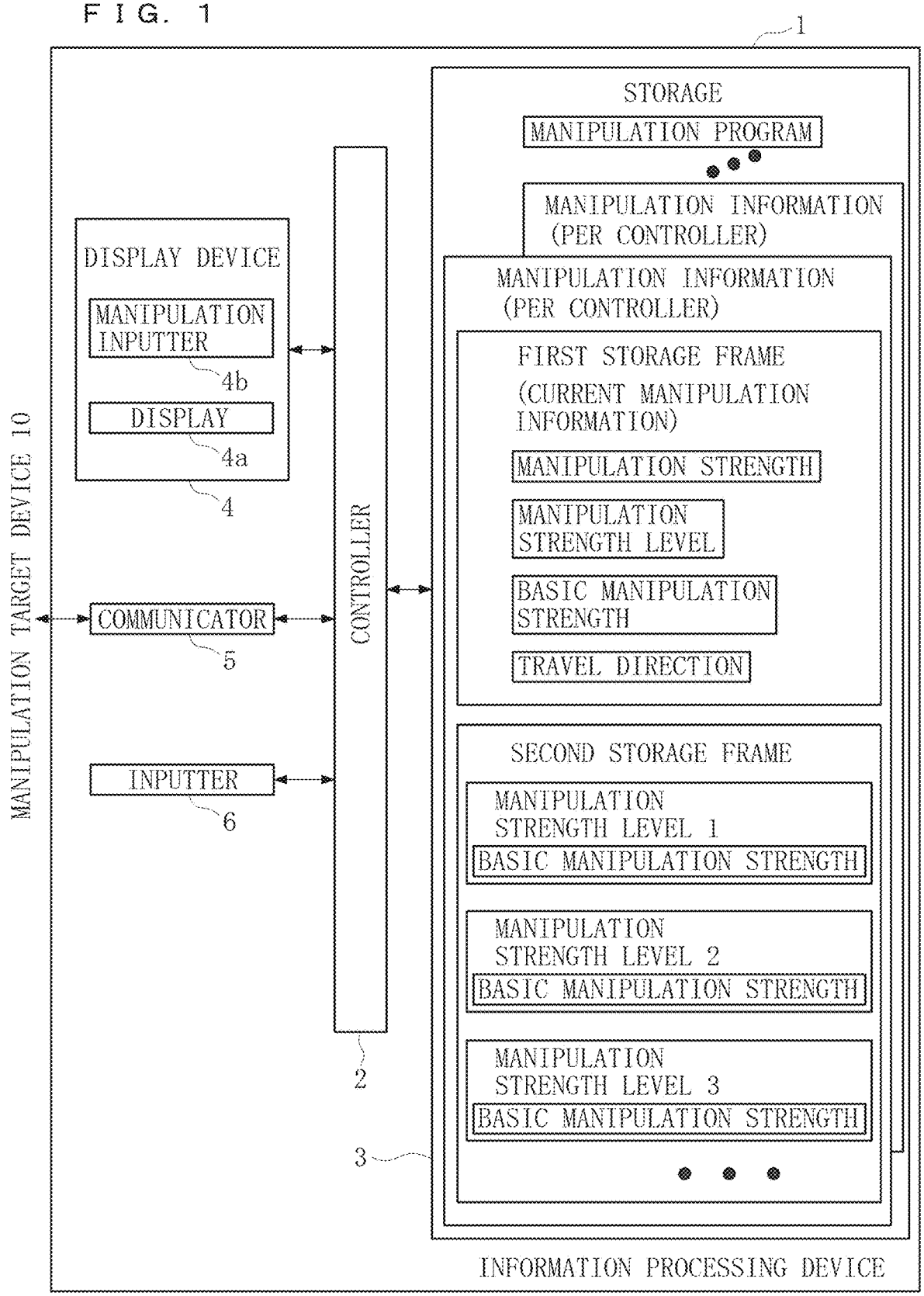
FIG. 1 is a block diagram illustrating a functional configuration of an information processing device according to one embodiment of the present disclosure.

As illustrated in FIG. 1, a computer 1 (an information processing device) according to one embodiment includes a controller 2, a storage 3, a display device 4, a communicator 5, and an inputter 6. The display device 4 may be included in the information processing device 1 or may be connected to the information processing device 1 wiredly and/or wirelessly, or via a network. The storage 3 may be included in the information processing device 1 or may be connected to the information processing device 1 wiredly and/or wirelessly, or via a network. The storage 3 may be an external storage connected to a network.

The storage 3 comprises a non-transitory recording medium including, for example, a flash memory, EEPROM, a solid state drive (SSD), and a hard disk drive (HDD). The storage 3 stores a program (manipulation program) for manipulating a manipulation target device 10 and manipulation information for each controller. A controller is at least one controller displayed on the display device 4, and alternatively called a virtual controller.

The controller 2, including a processor, loads the manipulation program stored in the storage 3, and executes processing related to manipulation of the manipulation target device 10 and processing related to display.

The display device 4 includes a display 4a and a manipulation inputter 4b. The display device 4 is, but not limited to, a touch panel. The display 4a is a liquid display panel or an organic EL panel, or the like. The manipulation inputter 4b accepts a contact manipulation with an instruction object that gives instruction, such as a finger of a user, a stylus pen, or a touch pen.

The inputter 6 is a device for accepting any input except an input to the manipulation inputter 4b.

The communicator 5 is a device for communicating with a communication device such as a Wi-Fi (registered trademark) device or a Bluetooth (registered trademark) device. The communicator 5 is capable of communicating with a communicator 15 of the manipulation target device 10 either directly or via a network.

As illustrated in FIG. 2, the manipulation target device 10 includes a drive 11, a controller 12, a storage 13, and a communicator 15.

The drive 11 is a drive device for manipulating the manipulation target device 10.

The storage 13 stores a program or data required by the controller 12 to control the drive 11.

The communicator 15 is capable of communicating with a communicator 5 of a communication device 1 either directly or via a network.

For example, assuming that the manipulation target device 10 is a drone, the drive 11 includes a plurality of motors, a plurality of propellers connected thereto, and driver circuits driving the motors.

The controller 12, includes a processor, executes the program stored in the storage 13, and performs the lift/weight vertical movement (throttle), left/right vertical rotation (rudder), thrust/drag longitudinal movement (elevator) and left/right lateral movement (aileron) of the manipulation target device 10 by controlling the rotation speed of the plurality of motors on the basis of manipulation information from the information processing device 1.

Examples of manipulation information used when manipulating or controlling a drone is explained. Drone manipulation uses the following components:
1. Lift vertical movement/Weight vertical movement (throttle)
2. Left vertical rotation/Right vertical rotation (rudder)
3. Thrust longitudinal movement/Drag longitudinal movement (elevator)
4. Left lateral movement/Right lateral movement (aileron)

When a controller displayed on the display screen is swiped, a two-dimensional vector is obtained based on the swipe direction and the swipe length. The swipe direction corresponds to the direction of the two-dimensional vector and the swipe length corresponds to the magnitude of the two-dimensional vector.

When a drone is manipulated, the four components (1 to 4 described above) to two two-dimensional vectors are assigned. By manipulating each of the two-dimensional vectors, the drone is manipulated.

For example, assume that a border line is provided on the display screen and "Area above the border line" is managed by a controller and "Area below the border line" is managed by another controller. A strength corresponding to the above components 1 to 4 is assigned, as described below, as two-dimensional vector information to the two controllers corresponding to "Area above the border line" and "Area below the border line".

A. Lift/Weight vertical movement and Left/Right lateral movement (the controller for the area above the border is used for manipulation)
X-axis direction: Strength of left/right lateral movement (aileron)
Y-axis direction: Strength of lift/weight vertical movement (throttle)

B. Thrust/Drag longitudinal movement and Left/Right vertical rotation (the controller for the area below the border is used for manipulation)
X-axis direction: Strength of a Left/Right vertical rotation (rudder)
Y-axis direction: Strength of a Thrust/Drag longitudinal movement (elevator)

A strength of the X-axis direction is a magnitude of the X-axis component of the two-dimensional vector and a strength of the Y-axis direction is a magnitude of the Y-axis component of the two-dimensional vector.

The above assignment is one example. Any other assignment method may be used instead.

For example, a case is explained where a screen of the controller for the area above the border line is swiped.

The swipe manipulation instructs a drone to vertically rotate at a curvature corresponding to the strength of the X-axis component of the vector obtained by a swipe. When the X-axis component is positive, the instruction is the right vertical rotation. When the X-axis component is negative, the instruction is the left vertical rotation.

The swipe manipulation is also a manipulation to instruct a drone to advance or retract at a speed corresponding to the strength of the Y-axis component. When the Y-axis component is positive, the instruction is to make the thrust longitudinal movement. When the Y-axis component is negative, the instruction is to make the drag longitudinal movement.

While the positive direction of the X-axis is rightward on the screen, the negative direction of the X-axis is leftward on the screen, the positive direction of the Y-axis is upward on the screen, and the negative direction of the Y-axis is downward on the screen in this example, the opposite relation may be available and the relation may be changed as appropriate depending on the orientation of the screen.

For example, in a case where a swipe occurs on the screen of the controller for the area below the border line upper right oriented, the X-axis component of the vector obtained is positive and the Y-axis component of the same is positive. The swipe manipulation thus instructs a drone to "advance thrust while vertically rotating rightwardly". The drone travels to draw a circle clockwise as viewed from above. When a swipe occurs on the screen upper left oriented, the X-axis component of the vector is negative and the Y-axis component of the same is positive. The swipe manipulation thus instructs a drone to "advance while vertically rotating leftwardly". When a swipe occurs on the screen lower right oriented, the X-axis component of the vector is positive and the Y-axis component of the same is negative. The swipe manipulation thus instructs a drone to "drag while vertically rotating rightwardly". When a swipe occurs on the screen lower left oriented, the X-axis component of the vector is negative and the Y-axis component of the same is negative. The swipe manipulation thus instructs a drone to "drag while vertically rotating leftwardly". The radius of the rotation circle varies on the strength of each of the X-axis and Y-axis components.

Upon a straight upward swipe, "the X-axis component of the vector is 0 and Y-component of the vector is positive". The swipe manipulation thus instructs to make the "thrust longitudinal movement". Upon a straight downward swipe, "the X-axis component of the vector is 0 and Y-component of the vector is negative". The swipe manipulation thus instructs to make the "the drag longitudinal movement". Upon a straight rightward swipe, "the X-axis component of the vector is positive and Y-component of the vector is 0". The swipe manipulation thus instructs "vertically rotate rightwardly". Upon a straight leftward swipe, "the X-axis component of the vector is negative and Y-component of the vector is 0". The swipe manipulation thus instructs "vertically rotate leftwardly".

Manipulation information is described in consideration of the above examples.

Manipulation information is information for the information processing device (the controller 2) to instruct the manipulation target device 10 of a desired operation. Manipulation information includes, for each controller, information stored in a first storage frame of the storage 3 and information stored in a second storage frame of the same.

The first storage frame stores, as "current manipulation information", a "manipulation strength", a "manipulation strength level", a "basic manipulation strength", and a "travel direction".

The "manipulation strength" in the "current manipulation information" represents a magnitude of the manipulation input in a direction the user indicates. In this embodiment, a value steps up (counts up) repeatedly during swiping and the value is used as the strength of the manipulation input. Detailed explanation will be explained with reference to FIG. 9 later. The "manipulation strength" is stored in a form suitable for manipulation details for the manipulation target device 10. For example, the "manipulation strength" may be stored in the following form using a magnitude of the manipulation input of swipe and an angle θ between the X-axis direction or the Y-axis direction and the direction of the swipe.

The "manipulation strength level" in "current manipulation information" represents the level of the "manipulation strength". In the present embodiment, it means the value which steps up when the instruction object sticks (or moves to) out of a detection range (screen edge determination frame described later) by swiping and when the instruction object is flicked upward. In other words, for example, it is a value corresponding to the number of times the instruction object has been sticks (or moves to) exceed the detection range or flicked upward in a swipe operation. In general, even when swiping for the same distance, the "manipulation strength level" is larger for a small screen, and the "manipulation strength level" is smaller for a large screen. It should be noted that lowering the "manipulation strength level" has the implication of returning to the state before the step-up of the "manipulation strength level".

The "basic manipulation strength" is set to the "manipulation strength" when the "manipulation strength level" is stepped up, that is, when the instruction object exceeds the detection range by swiping or is flicked upward. The "basic manipulation strength" thereafter becomes a reference value (initial value) for stepping up the operation intensity.

The "manipulation direction" in "current manipulation information" indicates the direction of the swipe operation.

With the information, the user can enjoy, even on a small screen, the feeling of manipulating or operating seamlessly on a large screen.

In the second storage frame, the "basic manipulation strengths" are stored for each "manipulation strength level". When the "manipulation strength level" steps-up, the "manipulation strength" at that time is stored as the "basic manipulation strength" for the step-up the "manipulation strength level". For example, it is assumed that the instruction object has exceeded the detection range on the screen for the second time in a swipe operation, and the "manipulation strength level" becomes "2". If the "manipulation strength" is "100" when the instruction object has exceeded the detection range, "manipulation strength" "100" is set at the "basic manipulation strength" for the "manipulation strength level" "2". Detailed processing will be described later with reference to FIG. 9.

Operation of the information processing device 1 and the manipulation target device 10 is described below.

Figure 3:
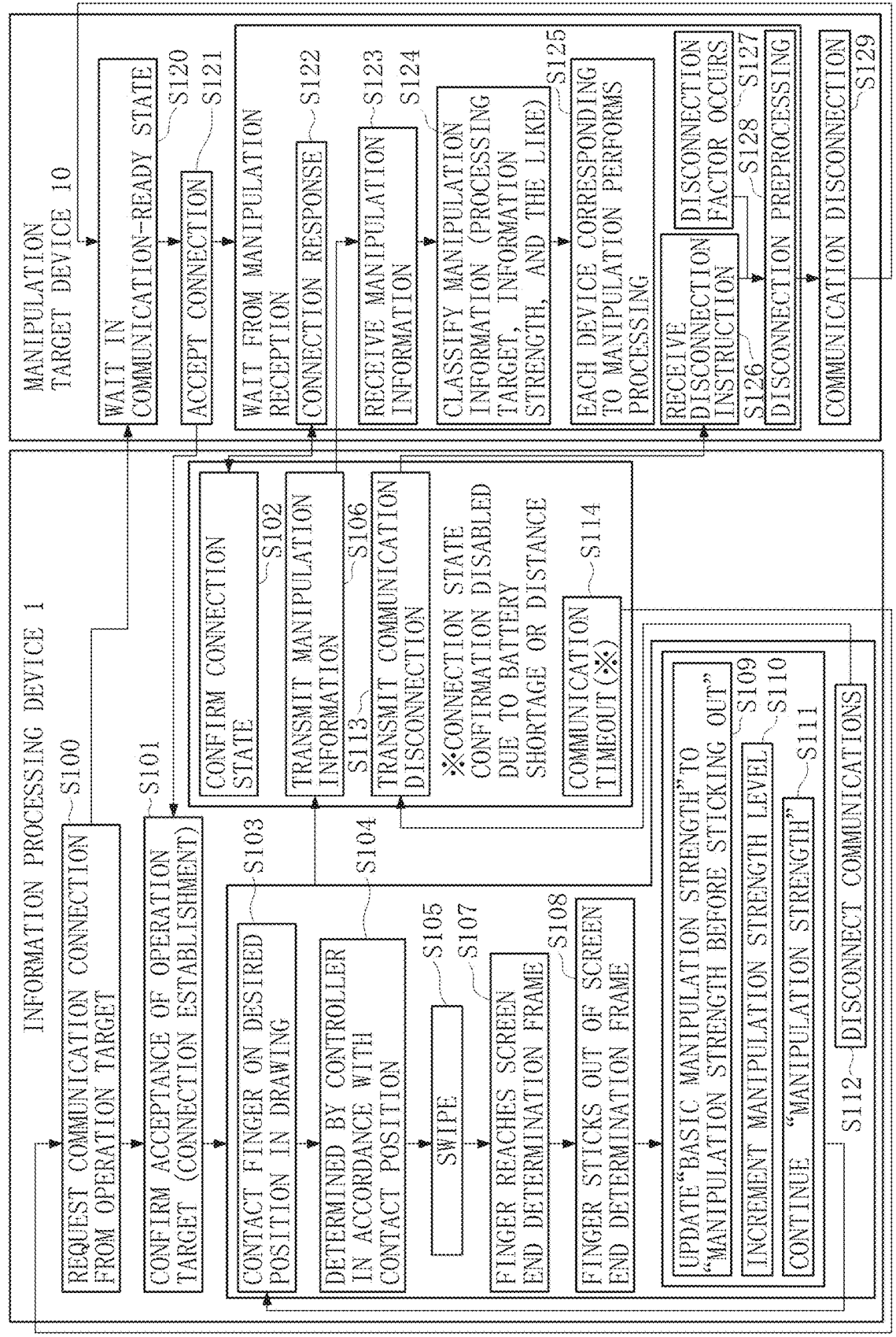
FIG. 3 is a flowchart illustrating a summary of the main processing of the information processing device and the manipulation target device assuming swipe manipulation as an example.

Referring to FIG. 3, a summary of the processing executed by the information processing device 1 and the manipulation target device 10 assuming that the manipulation made on a controller displayed on the screen of the display device 4 is a swipe, is described.

The information processing device 1 requests a communication connection from the manipulation target device 10 (S100). The manipulation target device 10, receiving a communication connection request from the information processing device 1 while on standby in the communication-ready state (S120), accepts the connection (S121). The information processing device 1 responds to the connection acceptance of the manipulation target device 10, and establishes a connection (S101).

An example of a screen to be displayed in a case where the information processing device 1 connects to the manipulation target device 10 is illustrated in FIG. 10.

As illustrated in FIG. 10, the screen is divided into two areas. The left area displays a frame LF for the manipulation terminal (information processing device) 1 and the right area displays a frame RF for the manipulation target used to display the motion of the manipulation target (drone) 10 viewed from the above. As mentioned above, the frame LF is divided into two areas (upper and lower areas) by a horizontal boundary line BL. The upper area displays a controller CONU and the lower area displays a controller COND.

When the user presses a "connection" button CB of the left frame LF, the information processing device 1 is connected to the manipulation target device 10 wirelessly, that is, via Wi-Fi (registered trademark) or Bluetooth (registered trademark). The range of a "field" found in the right frame RF of the screen represents a range where a wireless connection between the information processing device 1 and the manipulation target device 10 is available. The "field" is capable of expanding the range by using a relay. When a range is specified in the connection-ready range, the range specification takes precedence. Note that the connection range does not limit the disclosure.

When a connection is established, the information processing device 1 and the manipulation target device 10 perform a connection state conformation (S102) and a connection response (S122) on a regular basis.

Once the connection is established in this way, assume that the user touches his/her finger at a desired position in the left frame LF on the screen of the manipulation inputter 4b (S103). The information processing device 1 detects the contact position and selects a controller to be used in accordance on the detected position (S104). The information processing device 1, upon a swipe (S105), transmits manipulation information corresponding to the swipe and the selected controller to the manipulation target device 10 (S106).

The manipulation target device 10, receiving the manipulation information (S123), identifies devices as a manipulation target such as a motor, and classifies the manipulation information into operation speeds, operation timings, and the like (S124). The manipulation target device 10 provides the classified manipulation information to the respective identified devices. The driver circuits in the driver 11 drives each identified device in accordance on the manipulation information (S125).

For example, as illustrated in FIG. 11A, in a case where the user touches his/her finger at a lower area below a border line BL of the left frame LF of the screen, the information processing device 1 shall use a controller displayed in the lower area of the screen to manipulate the manipulation target device 10.

The following is an example using a drone. In this example, the lower area of the left frame LF in the screen functions as a controller COND for the left/right vertical rotation (rudder) and for trust/drag longitudinal movement (elevator) of the manipulation target device 10. The information processing device 1 displays, as illustrated, an image of the controller COND representing a travel direction, in the lower area of the screen. The image of the virtual controller displayed here is one example. As mentioned above, the manipulation target device 10 makes the left/right vertical rotation, and the thrust/drag longitudinal movement on the basis of an orientation and a magnitude of a two-dimensional vector corresponding to a swipe.

The information processing device 1 displays an image of a field where the manipulation target device 10 travels, that is, a "top view", in the right frame RF of the screen. The information processing device 1 may display a position of the manipulation target device 10 and an image taken by the manipulation target device 10 in an overlapped manner, in the right frame RF.

After the swipe, assume that a finger has reached a screen end determination frame (S107). The screen end determination frame is a predetermined frame. In the example of FIG. 11A, the left frame LF of the screen can be used as a screen end determination frame in a case where a contact between the finger and the screen starts from the area below the border line BL. The left frame LF of the screen can be used as the screen end determination frame also in a case where a contact between the finger and the screen starts from the area above the border line BL. While the border line BL is not used as the screen end determination frame in this example, the border line BL may be used as a part of the screen end determination frame.

Assume that the finger sticks (or moves to) out of the screen end determination frame LF (S108). The information processing device 1 updates the "basic manipulation strength" to the "manipulation strength" just before sticking out (S109), adds "1" to the "manipulation strength level" (S110) and holds the "manipulation strength" (S111). The information processing device 1 then returns to the operation of S103.

In this way, upon a swipe, a controller corresponding to a contact position is used to transmit manipulation information corresponding to the manipulation to the manipulation target device 10. This manipulates or control the manipulation target device 10.

Assuming that the user, for example, pushes a disconnection button SB to instruct disconnection between the information processing device and the manipulation device 10 (S112). The information processing device 1 transmits a disconnection instruction to instruct disconnection of communications to the manipulation target device 10 (S113).

The manipulation target device 10 receives the disconnection instruction (S126), and, performs disconnection preprocessing (S128) in response to the received disconnection instruction, disconnects the communications (S129). When a factor requiring disconnection of communications arises in the manipulation target device 10 (S127), the manipulation target device 10 disconnects the communications (S129) following disconnection preprocessing (S128).

When confirmation of a communication state is disabled due to a factor such as a low battery or a travel distance (a communication time-out) (S114), the information processing device 1 returns to the operation of S100.

Figure 4:
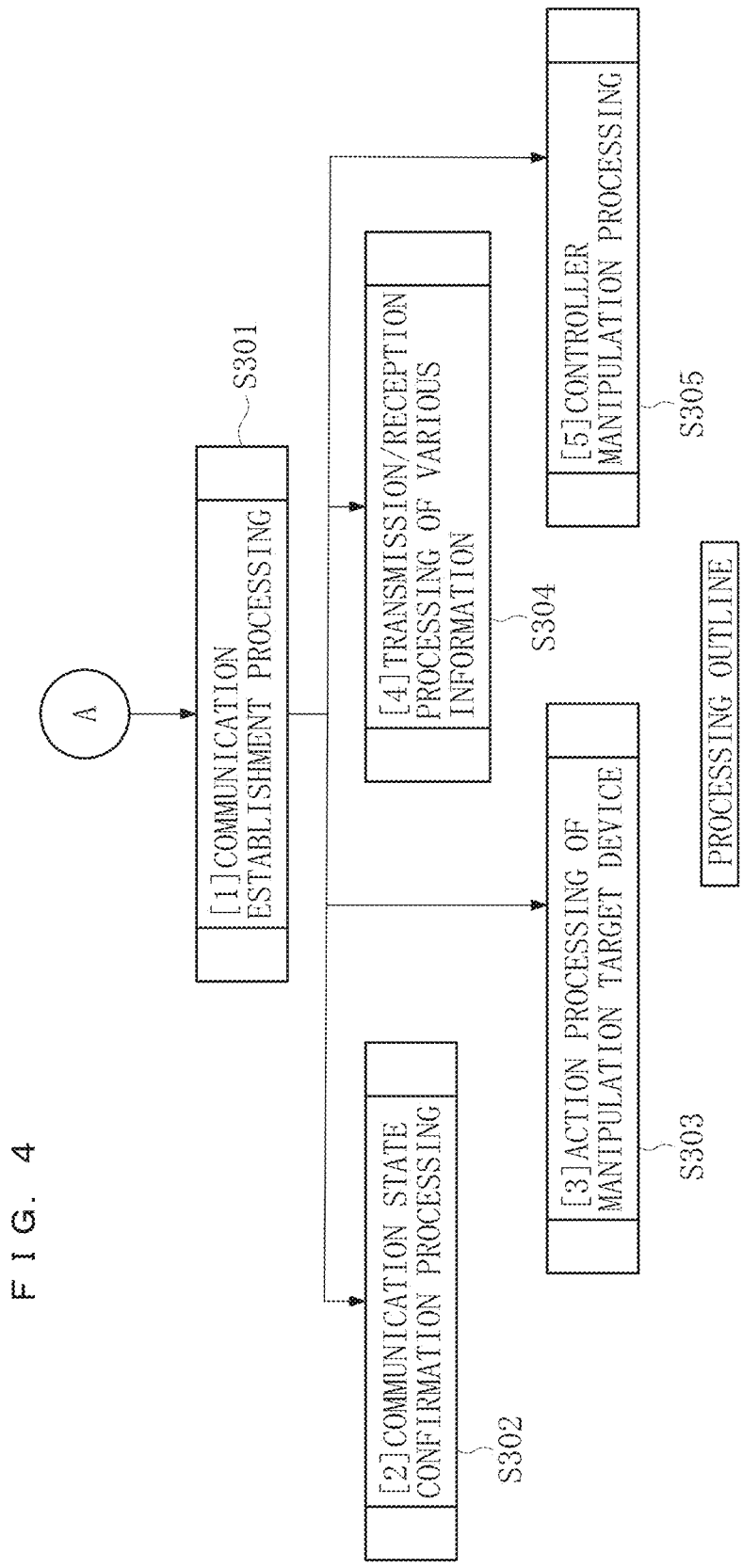
FIG. 4 illustrates an outline of the processing of the information processing device and the manipulation target device.

Next, by using FIGS. 4 to 9, an outline of the processing executed in the information processing device 1 and the manipulation target device 10 is described. FIG. 4 shows whole process and the FIGS. 5 to 9 show detail of the processes S301 to S305 shown in FIG. 4.

As shown in FIG. 4, the information processing device 1 and the manipulation target device 10 execute communication establishment processing so as to allow bidirectional communications (S301).

Upon establishment of communications, the information processing device 1 executes, as appropriate, communication state confirmation processing to conform a communication state on the manipulation target device 10 (S302).

The manipulation target device 10 receives manipulation information from the information processing device 1 and executes processing (action processing) corresponding to the manipulation information (S303).

The information processing device 1 executes transmission/reception processing of various information (S304).

The information processing device 1 executes manipulation processing of a controller and generates manipulation information obtained by manipulation by the user (S305).

Figure 5:
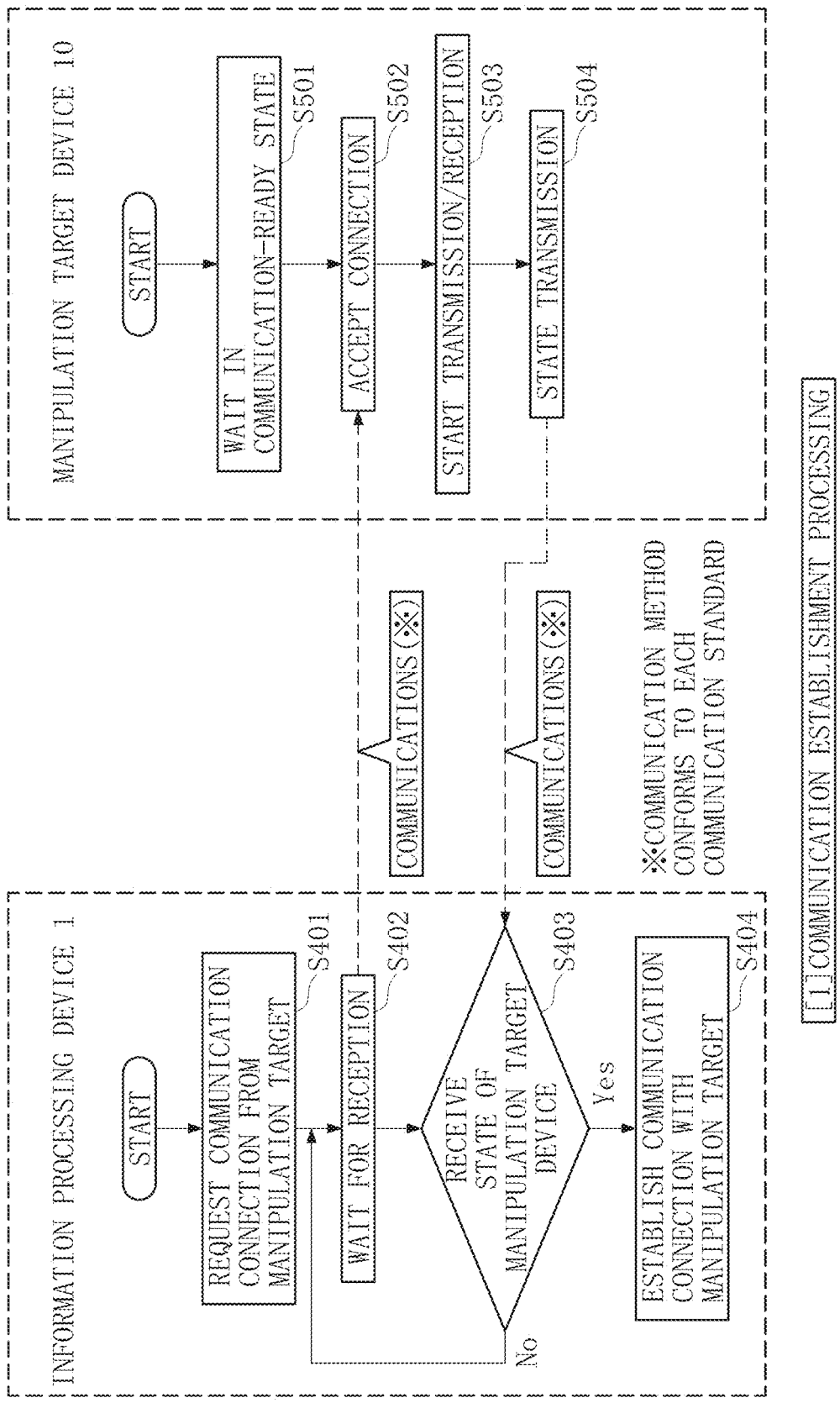
FIG. 5 is a flowchart illustrating communication establishment processing between the information processing device and the manipulation target device.

Referring to FIG. 5, communication establishment processing by the information processing device 1 and the manipulation target device 10 (FIG. 4: S301) is detailed.

The information processing device 1 (more specifically, the controller 2), requests a communication connection from the manipulation target device 10 (S401). A communication method used for communications conforms to each communication standard used by the information processing device 1 and the manipulation target device 10 in common (and so forth). The information processing device 1 waits for a response from the manipulation target device 10 (S402).

The manipulation target device 10, while on standby in a communication-ready state (S501), receives a request made by the information processing device 1, accepts a connection (S502), and starts data transmission/reception with the information processing device 1 (S503). The manipulation target device 10 transmits state information indicating that data transmission/reception has started to the information processing device 1 (S504).

The information processing device 1 determines whether or not state information on the manipulation target device 10 is successfully received (S403). When reception is unsuccessful, the information processing device 1 waits for reception (S402). Upon successful reception, the information processing device 1 establishes a communication state with the manipulation target device 10 (S404).

Figure 6:
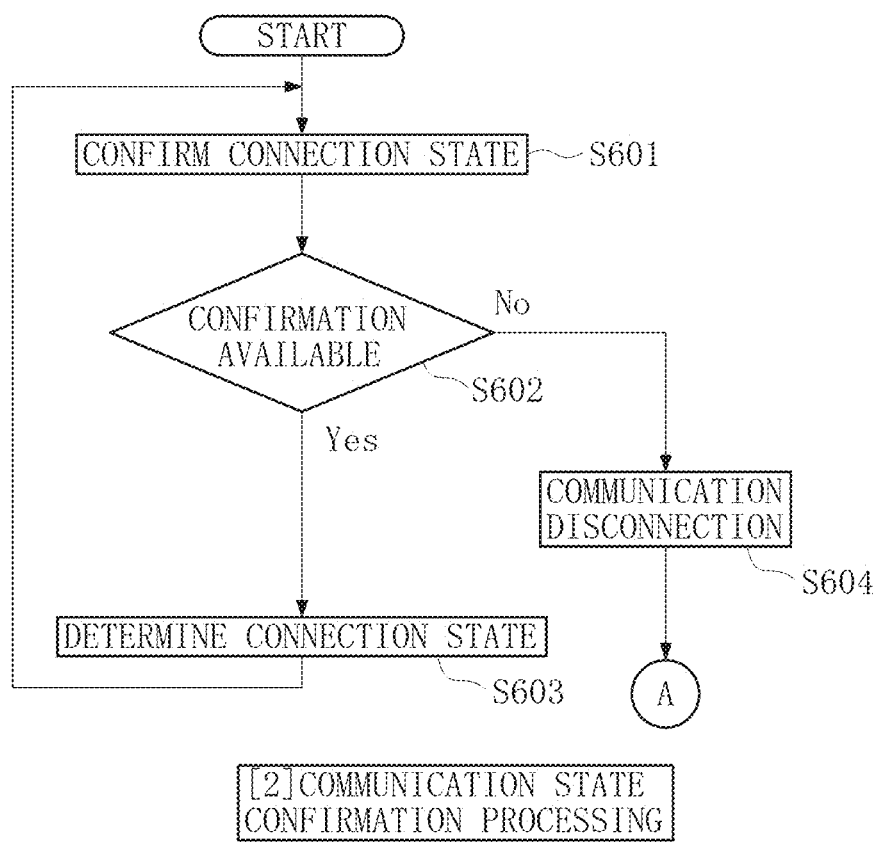
FIG. 6 is a flowchart illustrating a communication state confirmation processing in the information processing device.

Referring to FIG. 6, communication state confirmation processing (FIG. 4: S302) is detailed.

The information processing device 1 confirms whether or not communications with the manipulation target device 10 are available, that is, a connection state (S601). Upon a successful confirmation that communications are available (Yes in S602), the information processing device 1 determines a connection state (S603), and returns to S601. Upon an unsuccessful confirmation (No in S602), the information processing device 1 disconnects the communications (S604), and returns to communication establishment processing (S301).

In this way, the information processing device 1 confirms, as appropriate, whether or not a communication state with the manipulation target device 10 is held.

Figure 7:
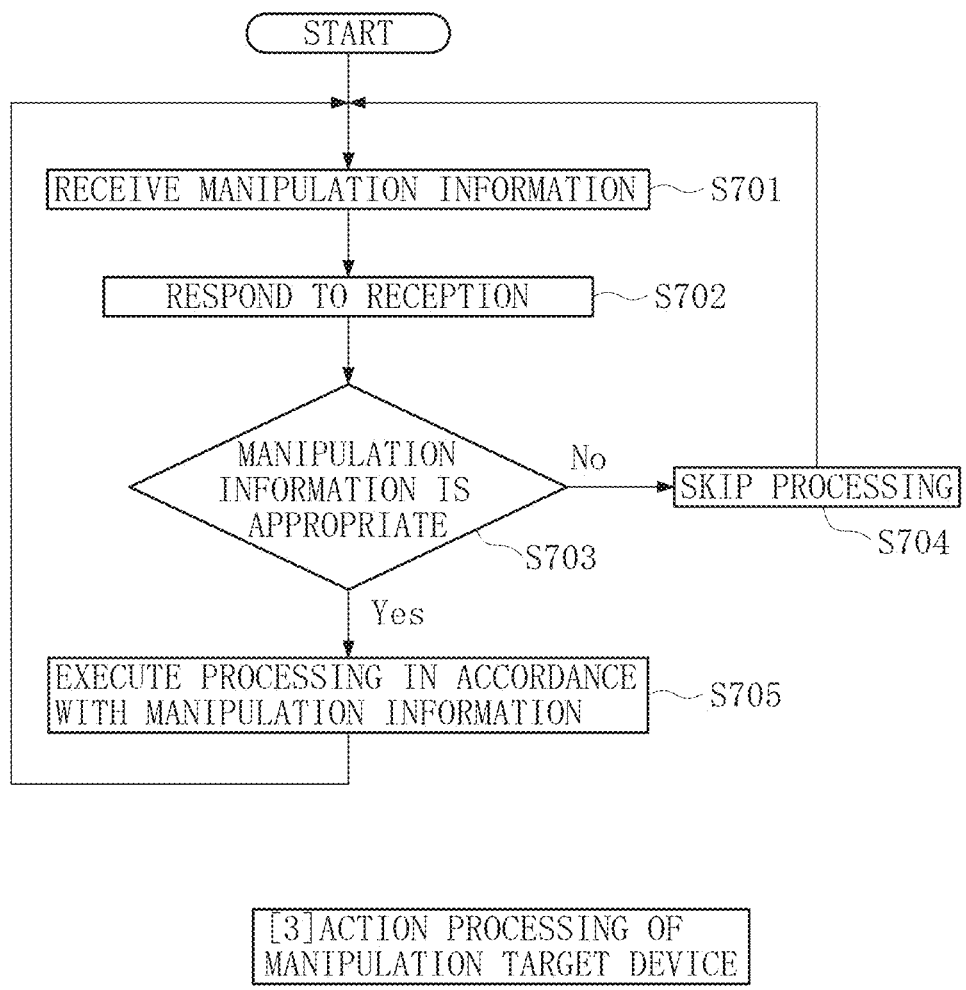
FIG. 7 is a flowchart illustrating action processing of the manipulation target device.

Referring to FIG. 7, action processing of the manipulation target device 10 (FIG. 4: S303) is detailed.

The manipulation target device 10 receives manipulation information coming from the information processing device 1 (S701), and responds to a reception (S702). The manipulation target device 10 determines whether or not the received manipulation information is appropriate (S703). When the manipulation information is inappropriate, the manipulation target device 10 skips processing and returns to S701 (S704). When the manipulation information is appropriate, the manipulation target device 10 (controller 12) executes processing to control the drive device 11 or the like in accordance with the manipulation information (S705).

Figure 8:
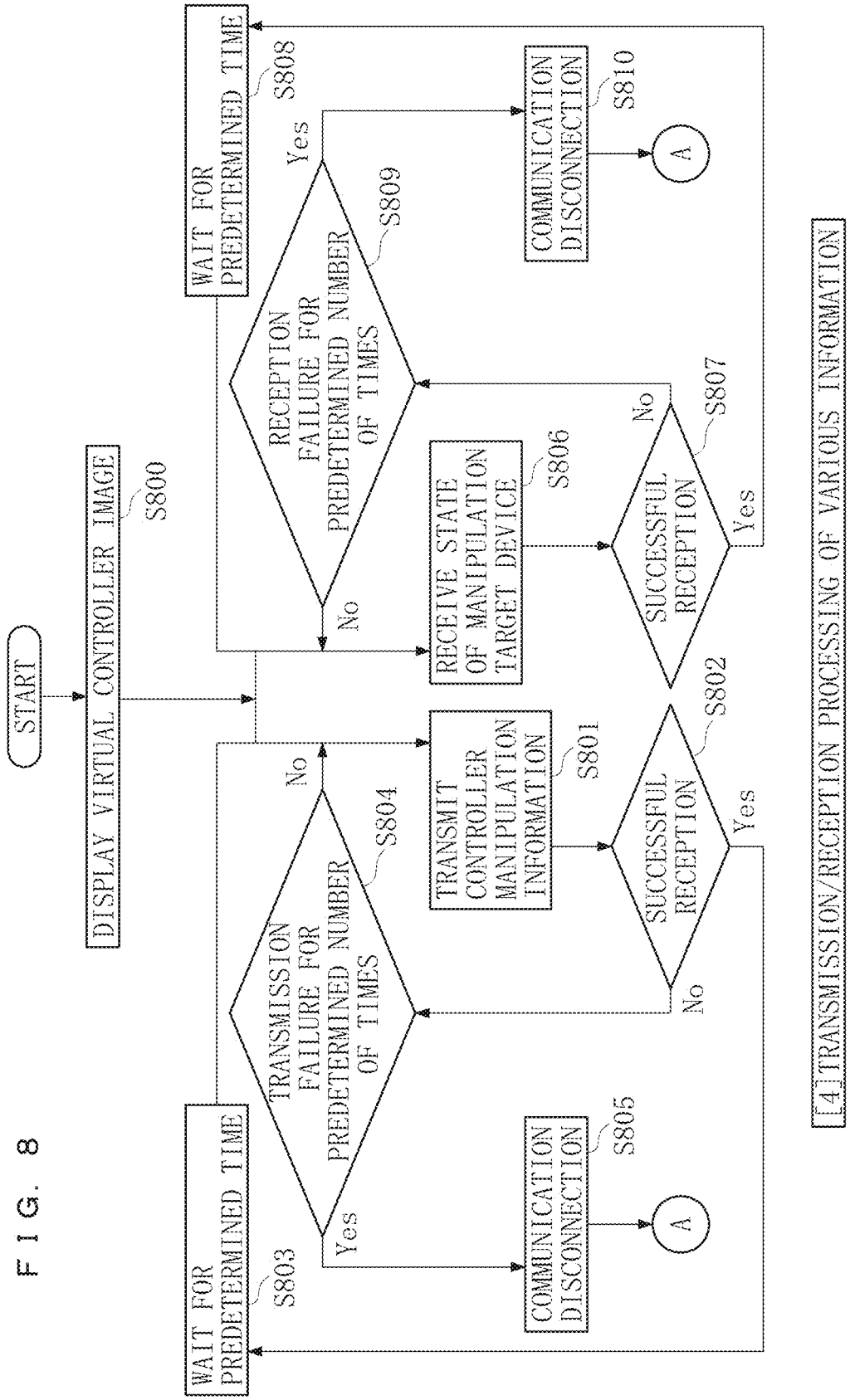
FIG. 8 is a flowchart illustrating transmission/reception processing of various information in the information processing device.

Referring to FIG. 8, transmission/reception processing of various information (FIG. 4: S304) is described.

First, the information processing device 1 (the controller 2) causes the display device 4 to display images of the controllers CONU and COND on the display 4a (S800). The user manipulates the controllers CONU and COND displayed on the display 4a by using an instruction object such as a finger. The information processing device 1 generates and holds manipulation information via the processing in FIG. 9 described later in accordance with the manipulation.

The information processing device 1 generates the images of the controllers while setting a predetermined range (for example the left frame LF) as the screen end determination frame.

The information processing device 1 preferably displays an image indicating the position of the manipulation target device 10 for example in the right frame RF of the display device 4.

More specifically, the controller 2 displays, as illustrated in FIG. 11A, for example, the controller CONU for manipulating aileron and throttle in the upper area above the border line BL of the left frame LF and the controller COND for manipulating rudder and elevator in the lower area below the border line BL of the left frame LF. The border line BL may be a vertical line, on the left and right sides which the controllers may be displayed. As illustrated in the "top view" of the right frame RF in FIG. 11A, the information processing device 1 displays an image indicating the position of the manipulation target device 10 in its movable field on the display device 4. In this way, in a case where the manipulation target device 10 is a drone, the display screen of the display device 4 preferably includes, a first area for manipulating rudder and elevator and a second area for manipulating aileron and throttle, separately from each other. The first and second areas are relative names, so that an area for manipulating rudder and elevator may be called a second area and an area for manipulating aileron and throttle may be called a first area.

The information processing device 1 transmits, to the manipulation target device 10, manipulation information input by manipulating the selected controller CONTU or CONTD (S801), and determines whether or not transmission is successful (S802). Upon a successful transmission (Yes in S802), the information processing device 1 waits for a specified duration (S803). Upon an unsuccessful transmission (No in S802), the information processing device 1 determines where transmission is unsuccessful for a specified count (S804). Upon unsuccessful transmission for a specified count (Yes in S804), the information processing device 1 disconnects communications with the manipulation target device 10 (S805), and returns to communication establishment processing (S301). Upon unsuccessful transmission for less than a specified count, (No in S804), the information processing device 1 returns to processing in S801.

In this way, the information processing device 1 functions as manipulation means for manipulating the manipulation target device 10 by transmitting transmission information to the manipulation target device 10. The information processing device 1 transmits manipulation information held in the storage 3 to the manipulation target device 10. As a result, even in a state where an instruction object is not touching the display device 4, the information processing device 1 is capable of transmitting manipulation information to the manipulation target device 10 to manipulate the same.

The information processing device 1 receives, from the manipulation target device 10, state information indicating its state (S806), and determines whether or not reception of the state information is successful (S807). Upon a successful reception (Yes in S807), the information processing device 1 waits for a specified duration (S808). Upon an unsuccessful reception, (No in S807), the information processing device 1 determines whether or not reception of state information is unsuccessful for a specified count (S809). Upon unsuccessful reception for a specified count (Yes in S809), the information processing device 1 disconnects communications with the manipulation target device 10 (S810), and returns to communication establishment processing (S301). Upon unsuccessful reception for less than a specified count, (No in S809), the information processing device 1 returns to processing in S806.

Referring to FIG. 9, processing of manipulation information generation and holding by manipulating the controller CONU or COND (FIG. 4: S305) is detailed. While the description assumes that a finger is touching the screen, the same processing flow is used also in a case where another instruction object such as a touch pen is touching the screen. While the controllers are displayed in partial areas of the screen as illustrated in FIG. 11A, a single controller may be displayed in the entire display screen.

Assume that a finger is touching a desired position in a screen area to which one of the controllers CONU and COND is displayed (hereinafter referred to as a responsible area for distinction) (S201). In FIG. 10, the left frame LF is divided by the border line BL into two areas each of which the controller CONU or COND is displayed in. The controller 2 updates the "manipulation strength" in the "current manipulation information" for a corresponding controller by the "basic manipulation strength" (S202).

A start timing of an operation in S201 occurs in the following two situations: a first situation is a case where "current manipulation information" is unspecified for a first manipulation or a case where "current manipulation information" is reset; and a second situation is a case where information assumed before a finger is lifted up from a responsible area is held as "current manipulation information".

In the first case, in the operation in S202, a "manipulation strength" in the "current manipulation information" is set to a default value (for example "0").

In the second case, via operations in S212, S217, or S223, a "manipulation strength" assumed before a finger sticks or moves to out of a responsible area is held as a "basic manipulation strength". In an operation in S202, a "manipulation strength" in the "current manipulation information" is updated to a "basic manipulation strength" that is held. As a result, in a case where a finger is touching a responsible area again, a manipulation starts or regimes from the status just before a finger is lifted up.

The present embodiment uses two areas each of which displays the controller. Accordingly, the information processing device 1 detects a contact position of a recontact and the "current manipulation information" held as manipulation information of a responsible area to which the contact position belongs is used for manipulation after a recontact. In other words, in the case of a recontact of the instruction object on a first area, manipulation of the manipulation target device 10 is restarted on the basis of "current manipulation information" held for the first area. In the case of a recontact of an instruction object on a second area, manipulation of the manipulation target device 10 is restarted on the basis of "current manipulation information" held for the second area. The "current manipulation information" used for the recontact is the same for any one of a swipe, an upward flick, a downward flick and a double touch. In the subsequent description, manipulation is assumed to restart on the basis of manipulation information held for a responsible area corresponding to a contact position upon a recontact and description of each case is omitted.

Next, the information processing device 1 determines whether or not a manipulation by an instruction object in a responsible area is a swipe, a flick in an upward direction (expressed as an "upward flick" in FIG. 9), a tap or a flick in a downward direction (expressed as a "downward flick" in FIG. 9), a double tap, or a press the stop button (S203).

The upward direction as criteria for an upward flick may be a direction of a predetermined first angle range with respect to a reference direction set on the screen of the display section 4a. Accordingly, an upward direction need not be a direction parallel to both lateral sides of the screen but refers to a direction in a predetermined angle range with respect to a reference direction.

A downward direction as criteria for a downward flick may be a direction of a predetermined second angle range with respect to a reference direction set on the screen and may be a direction nearly opposite to the upward direction. Accordingly, a downward direction need not be a direction parallel to both lateral sides of the screen but refers to a direction in a predetermined angle range with respect to a reference direction.

Upward and downward are determined on the basis of a relation with a display device, orientation of the display device or the direction of the inclination thereof or the like. Thus, an upward direction and a downward direction may be represented conceptually as a first direction and a second direction.

The swipe is a manipulation for sliding the instruction object in one direction on or over the screen. The flick is a manipulation for the sliding the instruction object with a short sudden movement in a direction. Difference between a swipe and a flick may be one defined to discriminate therebetween on the basis of a known technology.

A term a "slide" or a "scroll" used instead of a swipe shall be included in a scroll.

A tap is a manipulation of a soft touch once on the screen. A double tap is a manipulation of a soft touch twice in a row.

<Operation in the Case of a Swipe>

If the controller 2 determines that the manipulation is a swipe in S203 (S204), the controller 2 steps up the "manipulation strength" of the "current manipulation information" by, for example, "1" (S208). The step-up value is not limited to "1" and is arbitrary. Next, the "travel direction" of the "current manipulation information" is updated according to the detected direction of the swipe (S209). When the swipe is immediately after re-contact, the initial value of the step-up may be reset to the "basic operation strength" and the "manipulation strength increase due to the swipe may be resumed, or the step-up may be resumed from the "manipulation strength" in the "current manipulation information". In other words, in the case of a swipe following a re-contact, the controller 2 generates new manipulation information based on the manipulation information held in the memory frame 3. However, it is arbitrary from which intensity the step-up is resumed.

A trial of a behavior has confirmed a merit of restarting to increase the "manipulation strength" by a swipe from the basic strength following the recontact. Details of this result are described, without an intention to limit the disclosure.

For example, assume that the "basic manipulation strength" at an n−1th level ("n−1 level default") is 10, and a basic manipulation strength at an nth level ("nth level default") is 300.

Assume a case where, upon a recontact, the "manipulation strength" by a swipe is restarted from the "manipulation strength" of the "current manipulation strength". In this case, while at an nth level, a tap mentioned later may return to a default at an n−1th level, but not to a default at an nth level. To return to a default at an nth level, a tap must take place at an n+1 level. Moreover, a tap at an nth level tends to result in an excessively lower speed while returning to a default at an n−1 level thus increasing difficulty in a manipulation. In addition, repeated recontacts at an n−1 level may increase the "manipulation strength" and the size of the screen end determination frame cannot limit the strength incremental value, thus resulting in a larger "manipulation strength" difference between adjacent "manipulation strength levels" and a lower manipulation precision. The role of the "basic manipulation strength" in a manipulation at the same strength level as a default speed and the role of a screen end determination frame as a limitation to a strength incremental range at the same strength level are lost.

On the other hand, in a case where a strength by a swipe is restarted to increase from a "basic manipulation strength" upon a recontact, the process starts from a default at an nth level. This offers a merit of an easy manipulation using a default at an n−1th level, a default at an nth level, or a default at an n+1 level.

As mentioned above, in the case of manipulation of a drone, the controller 2 preferably recognize a swipe as a two-dimensional vector, assume a direction of the two-dimensional vector as a "travel direction", assume a magnitude of an x component of the two-dimensional vector as the "manipulation strength" of rudder, and assume a magnitude of a y component as a "manipulation strength" of elevator.

Next, the controller 2 determines whether or not a finger is lifted from the screen (S210). It is needless to say that this processing may be interrupt processing caused when a finger is lifted from the screen. While a finger is touching the screen, that is, while a swipe is going on, the controller 2 executes an operation S208 and S209. In a case where the finger is lifted up, the controller 2 determines whether or not the finger is lifted up inside a screen end screen end determination frame (S211).

As explained before, the "screen end determination frame" may coincide with a responsible area for a manipulation or a range exceeding a responsible area may be defined as a screen end determination frame, or the entire screen may be defined as a screen end determination frame.

In any one of the above cases, a configuration is possible where a manipulation takes place upon a touch on a desired position of the screen irrespective of the presence/absence of an image or object of the controller, or the like. A configuration is possible where a manipulation is not accepted for a partial display portion. Which area of the screen accepts a manipulation does not limit the disclosure.

A determination of whether or not a finger is lifted from the screen in S210 precedes a determination of whether or not a finger is lifted outside a screen end determination frame in S211. Thus, a phenomenon that a finger is lifted from the screen includes both cases: a case where a finger is lifted up inside a screen end determination frame; and a case where a finger is lifted up outside a screen end determination frame.

Depending on hardware or a program to be installed. It may be possible to determine whether or not a finger is lifted up inside of a screen end determination frame or outside of a screen end determination frame on the basis of a determination at a single level, instead of two levels as in S210 and 211. Such a case determines whether or not a finger is lifted from the screen; such hardware or a program is within the scope of the disclosure.

In a case where it is determined that a finger is lifted up inside a screen end determination frame in S211 (No in S211), the controller 2 holds a "basic manipulation strength" in the "current manipulation information" stored in a first storage frame (S212), holds a "manipulation strength level" in the "current manipulation information" (S213), holds a "manipulation strength" in the "current manipulation information" (S214), holds a "travel direction" in the "current manipulation information" (S215), and waits until a finger touches a desired position in a responsible area. These data are held for each controller corresponding to a responsible area.

In this way, in a case where a finger is lifted up inside a screen end determination frame after a swipe, "current manipulation information" remains held. Thus, even in a case where a finger is lifted up, the "current manipulation information" that is held is transmitted to the manipulation target device 10 (S801).

In this way, "current manipulation information" is held. When a finger has touched the screen again, a manipulation assumed before a finger is lifted up continues by the step of S202 and subsequent steps. Upon a similar swipe manipulation of course as well as any other manipulation than a swipe during a manipulation determination upon a recontact (S203), a manipulation assumed before a finger is lifted up is continued, which assures an intuitive and excellent operability.

When it is determined that a finger is lifted up outside a screen end determination frame in S211 (Yes in S211), the controller 2 stores a "manipulation strength" of a first storage frame just before a finger is sticks out or move out of the screen end determination frame as a "basic manipulation strength" of a second storage frame (S216). In this case, a "manipulation strength level" of a second storage frame for storing a "basic manipulation strength" is the "manipulation strength level" in "current manipulation information".

Next, the controller 2 sets a value of a "manipulation strength" of the first storage frame stored in a second storage frame to the "basic manipulation strength" of the first storage frame to update the "current manipulation information" (S217).

Next, the controller 2 increments a "manipulation strength level" by one (1), because a "basic manipulation strength" is set anew, to set a one-level higher manipulation strength and updates the "current manipulation information" (S218). The value to be added is not limited to one (1). The controller 2 holds a "manipulation strength" in the "current manipulation information" unchanged (S219), holds the "travel direction" unchanged (S220), and waits until a finger touches a desired position in a responsible area.

Even in a case where a finger is lifted up outside a screen end determination frame, a "manipulation strength" and the "travel direction" in the "current manipulation information" are held by an operation in S219 and S220. Thus, as in the case of S212 to S215, upon reaching of a frame timing, even in a case where a finger is lifted up, the manipulation target device 10 can be manipulated on the basis of the held "current manipulation information".

The "current manipulation information" is held, so that, upon a recontact of a finger on the screen, a manipulation assumed before a finger is lifted up is continued by S202 and the subsequent steps on the basis of the held "current manipulation information". Upon a similar swipe manipulation of course as well as any other manipulation than a swipe during a manipulation determination upon a recontact (S203), a manipulation assumed before a finger is lifted up is continued, which assures an intuitive and excellent operability.

In S216, the "basic manipulation strength" at the "manipulation strength level" of a second storage frame corresponding to the "manipulation strength level" in the "current manipulation information" of a first storage frame is specified. In S217 and S218, the "manipulation strength level" in the "current manipulation information" is incremented by one and the "manipulation strength" at a new level that is one-level higher is updated upon a next swipe manipulation. Thus, a swipe sticks out of the screen end determination frame, a manipulation at a one-level higher "manipulation strength level" takes place in a next manipulation, which assures a gradual manipulation.

Processing to increase the strength in the "current manipulation information" by one level is the "current manipulation information" generated on the basis of a finger that has left the screen. In other words, it is manipulation information corresponding to an area that was touched by the finger.

<Screen Example for a Swipe: A Screen Example is an Exemplary Drone Manipulation Screen; the Same Applies to the Other Screen Examples.>

<Example of FIG. 11A: A Swipe has Started from Contact of a Finger on the Area Below the Border Line BL in the Left Frame LF>

First, a case of a contact on a controller COND for the area below the border line BL in the left frame LF is described. Assume that a finger has touched the area below a border line BL and the finger has traveled. An image of the controller COND is representing a travel direction of the finger. The numeric value of the "manipulation strength" is updated in accordance with a travel distance of the finger.

Manipulation information is transmitted from the information processing device 1 to the manipulation target device 10 so that the manipulation target device 10 makes the thrust longitudinal movement and the right vertical rotation in accordance with an orientation of a two-dimensional vector. A top view is an image representing a travel direction of the manipulation target device 10 in accordance with the manipulation information.

Figure 11B:
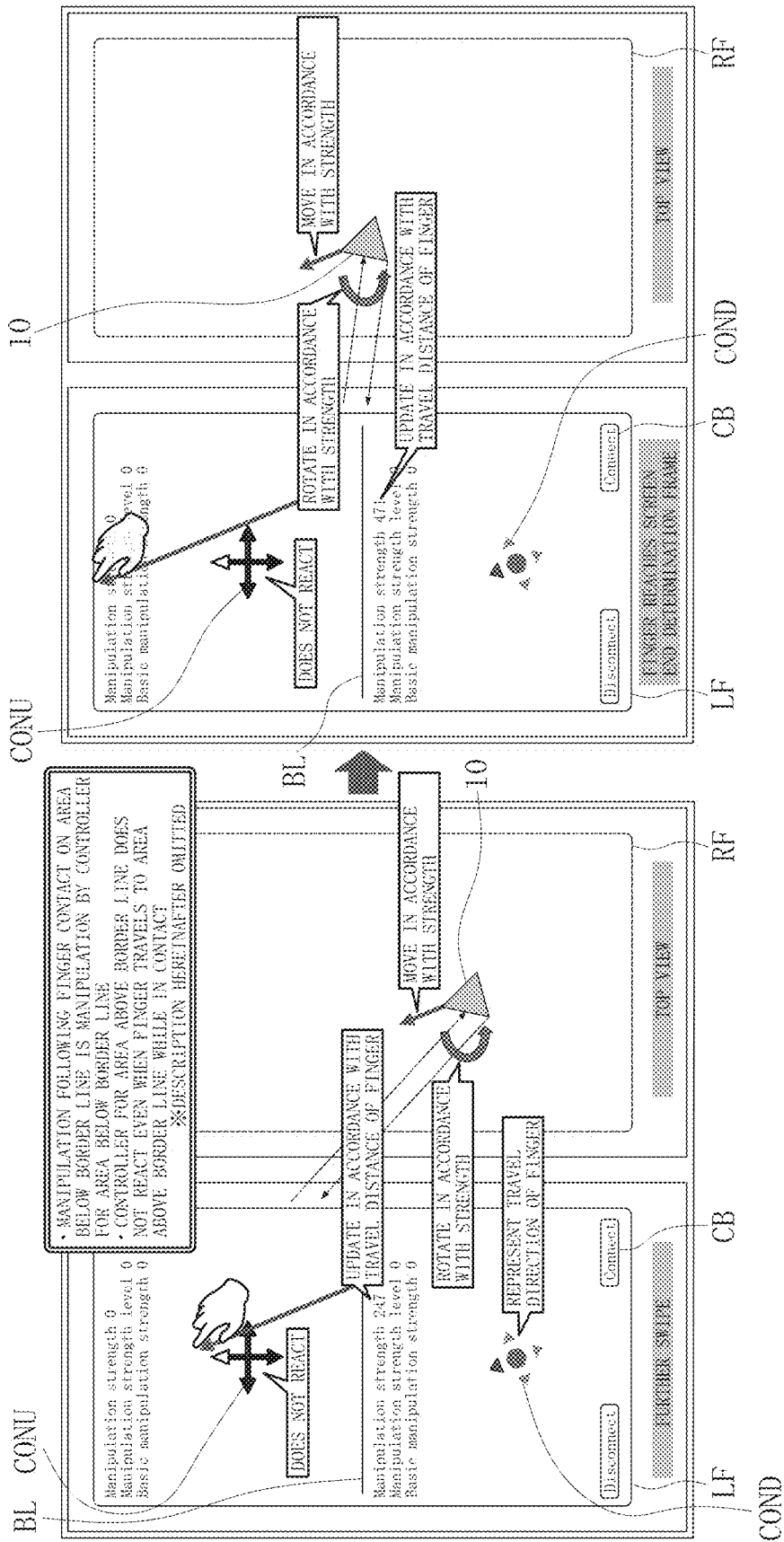

<Example of FIG. 11B: A Finger has Stuck Out of the Border Line BL>

Even in a case where a finger has touched the area (a first area), below a border line BL, a swipe manipulation has stuck out of the border line BL and reached a controller CONU for the area (a second area) above a border line BL, the controller CONU for the area (the second area) above a border line BL shall not react. A manipulation that has started from the area (the first area) below the border line BL shall be a manipulation using the controller COND for the area (the first area) below the border line BL. In accordance with a travel distance of the finger, the "manipulation strength" is updated. An image of the controller COND represents a travel direction of a finger. The manipulation target device 10 advances in accordance with a magnitude of a y component corresponding to a strength of the travel distance of the finger and vertically rotates in accordance with a magnitude of an x component of the same.

<Example of FIG. 1C: A Finger has Stuck Out of a Screen End Determination Frame>

Assume that a finger has stuck out of the left frame LF serving as the screen end determination frame. In this case, the "manipulation strength" is held and the "manipulation strength level" is increased by one level and the "basic manipulation strength" is updated. The manipulation target device 10 continues a travel in accordance with the "manipulation strength" and a travel direction that are held in the "current manipulation information".

Assume that the finger is caused to make a recontact on a desired position in the area below a border line BL. The "manipulation strength", the "manipulation strength level", and the "basic manipulation strength" are held and the "current manipulation information" is updated in accordance with a motion of the finger after the recontact.

Figure 11D:
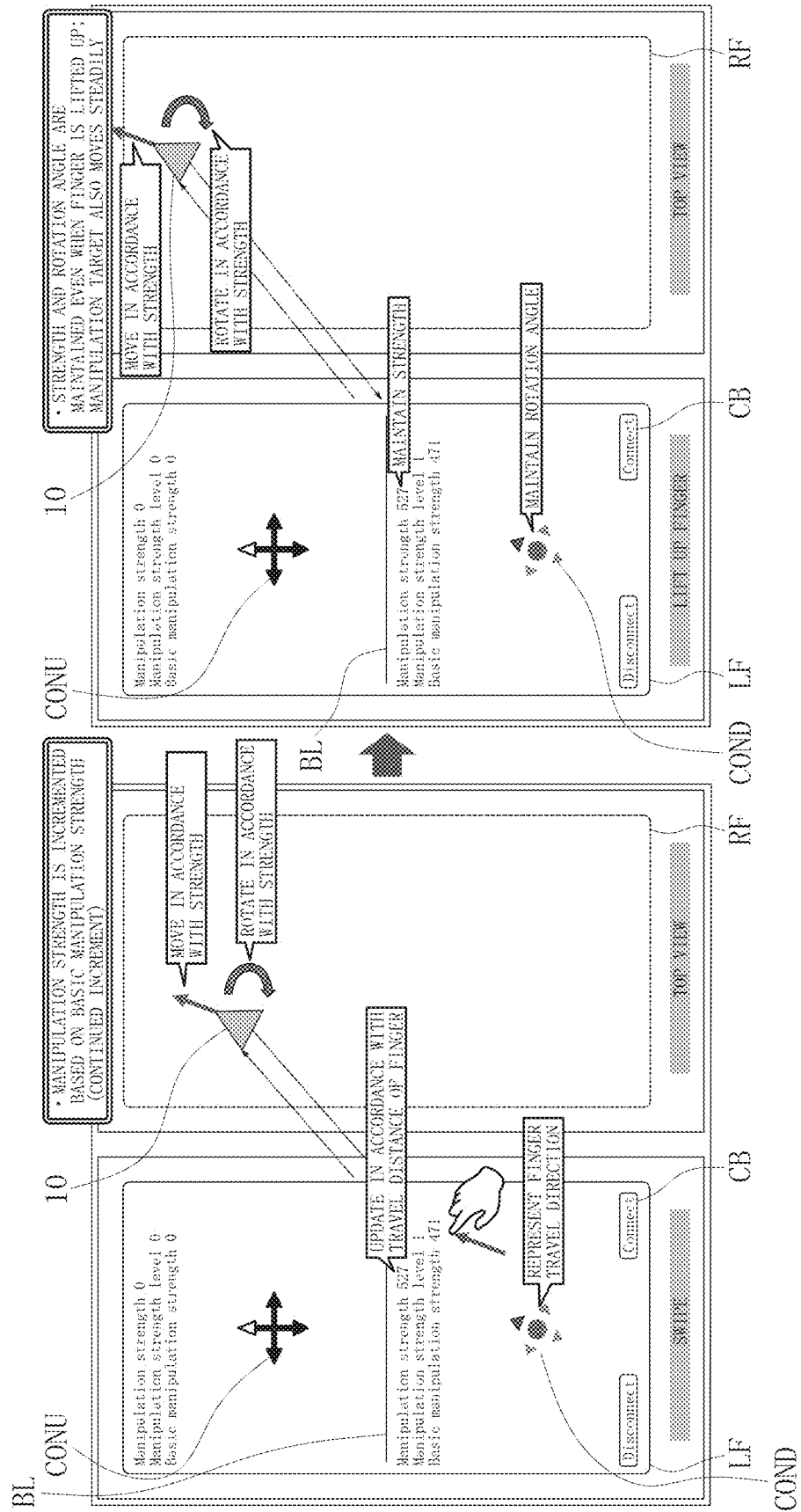

<Example of FIG. 11D: Swipe after a Recontact>

After a recontact on the area below the border line BL, the "manipulation strength" is updated in accordance with a travel distance of the finger. The "manipulation strength" is incremented on the basis of the "basic manipulation strength" (referred to as continuous increment). An orientation of an arrow on an image of the controller COND changes in accordance with a travel direction of the finger. Even in a case where the finger has left the screen, the "manipulation strength" and a rotation angle (a travel direction) are held unchanged, and the manipulation target device 10 continues a travel in accordance with an unchanged "manipulation strength" and travel direction.

<Example of FIG. 11E: Swipe Following a Recontact after FIG. 11D>

In FIG. 11D, a finger is lifted without reaching the left frame LF serving as the screen end determination frame. Afterwards, assume that a recontact has occurred on the area below the border line BL. Assuming that a recontact has occurred after the finger has left the screen once, the "manipulation strength" returns to the "basic manipulation strength". In FIG. 11E, while upon a recontact, the "basic manipulation strength" is regained and an increase in the "manipulation strength" by a swipe restarts, an increase in the "manipulation strength" by a swipe may restart from the "current manipulation strength" that is held. In accordance with a travel distance of the finger, the "manipulation strength" is incremented (a continuous increment), and an orientation of an arrow on an image of a virtual controller COND changes in accordance with a travel direction of the finger.

<Example of FIG. 11F: A Contact on a Controller CONU in the Area Above the Border Line BL>

After FIG. 11E, the "manipulation strength" and a rotation angle (a direction) are held, and the manipulation target device 10 keeps traveling even in a case where a finger is lifted up. Assume that a finger has touched a desired position in the area above the border line BL. This is a manipulation to select the area above the border line BL as a responsible area, and the manipulation strength and rotation angle of the area below the border line BL are not updated. The manipulation in the area above the border line BL is for the lift vertical movement, weight vertical movement, left lateral movement, and right lateral movement of the manipulation target device 10. As illustrated in the lower right figure in FIG. 1 IF, a side view is preferably displayed to represent an upward/downward or a left/right travel of the manipulation target device 10, although this does not limit the disclosure.

<Example of FIG. 11G: Swipe Via the Controller CONU for the Area Above the Border Line BL>

A "manipulation strength" is updated in accordance with a travel distance of a finger. An image of the controller CONU rotates in accordance with a travel direction of the finger. The lift/weight vertical movement (throttle) and left/right lateral movement (aileron) take place in accordance with a direction and a magnitude of a two-dimensional vector of a swipe in the area above the border line BL. As illustrated in the side view, a magnitude of an x component of the two-dimensional vector represents a strength of a left/right lateral movement (aileron) and a magnitude of a y component represents a strength of the left/weight vertical movement (throttle). During manipulation by the controller CONU for the area above the border line BL, a manipulation by the controller COND for the area below the border line BL is not canceled, so that the left vertical movement, weight vertical movement, left lateral movement, or right lateral movement during the left vertical rotation, right vertical rotation, thrust longitudinal movement, or right vertical rotation is available.

Figure 11H:
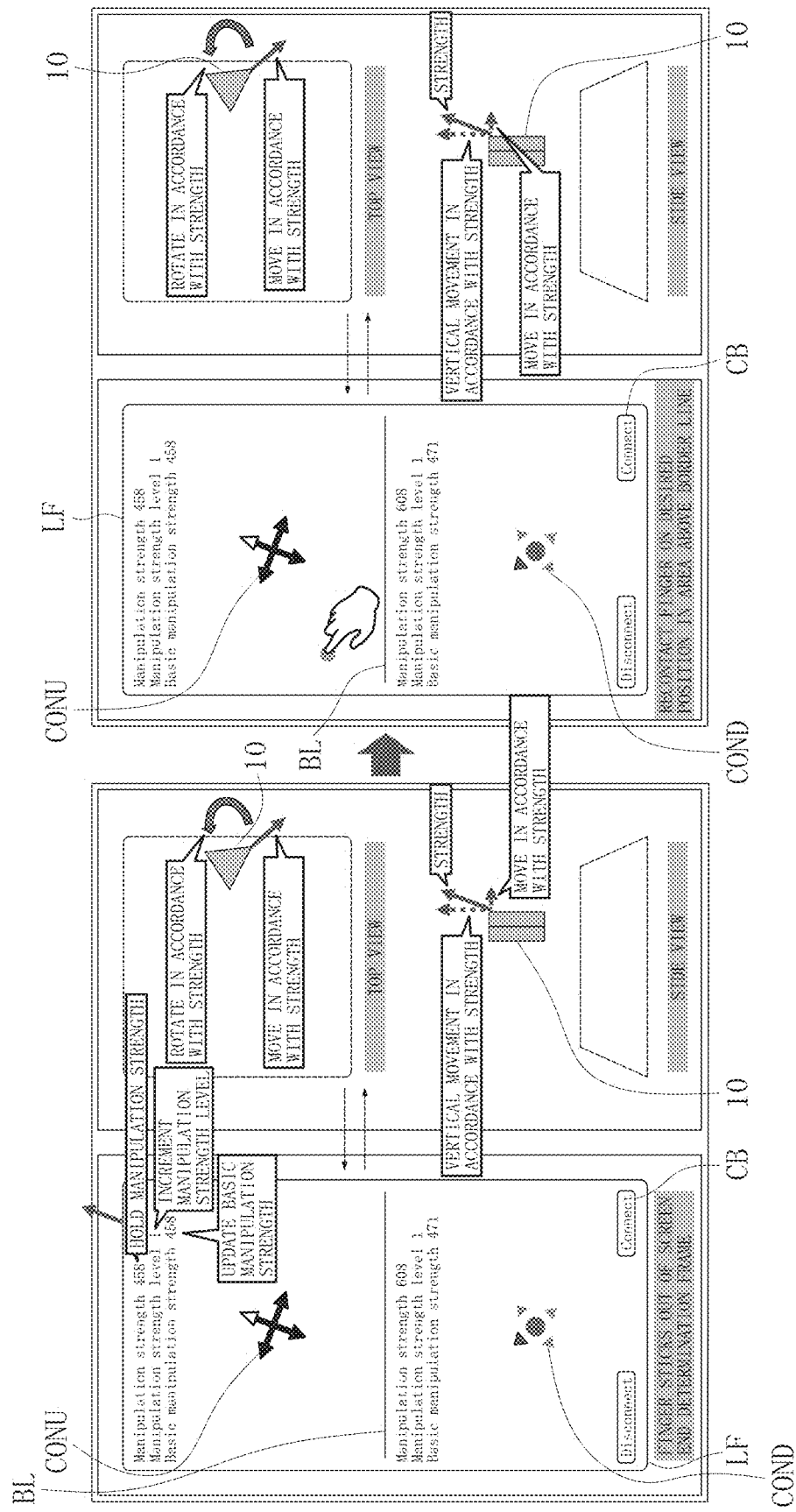

<Example of FIG. 11H: While Using a Controlled for the Area Above the Border Line BL, a Finger has Stuck Out of a Screen End Determination Frame, and a Recontact on a Desired Position in the Area Above the Border Line BL>

From a manipulation in FIG. 11G, in a case where a finger has stuck out of the left frame LF serving as the screen end determination frame, the "manipulation strength" of the controller CONU for the area above a border line BL is held, the "manipulation strength level" is incremented, and the "basic manipulation strength" is updated. Even in a state the finger is lifted up, the thrust longitudinal movement and the vertical rotation are continued on the basis of manipulation information of the area below the border line BL, and the lift vertical movement and movement are continued on the basis of manipulation information of the area above the border line BL.

In this state, assume a recontact of a finger on a desired position in the area above a border line BL and a swipe takes place. This case is illustrated in FIG. 11I.

<Example of FIG. 11I: Swipe after a Recontact on a Desired Position in the Area Above the Border Line BL>

As long as a manipulation continues on a finger touching the area above the border line BL, the controller CONU for the area above the border line BL is used for manipulation. Even in a case where a finger has moved to the area below the border line BL with the finger touching the area above the border line BL, the controller COND for the area below the border line BL does not react.

The "manipulation strength" of the controller CONU for the area above the border line BL is updated in accordance with a travel distance of a finger and an image of the controller CONU rotates in accordance with a travel direction of the finger. As illustrated in the side view, the manipulation target device 10 is lowered at a strength corresponding to a magnitude of a y component of a two-dimensional vector of a swipe, and the manipulation target device 10 travels leftward at a strength corresponding to a magnitude of an x component. Assume that the finger has reached the left frame LF serving as the screen end determination frame.

Figure 11J:
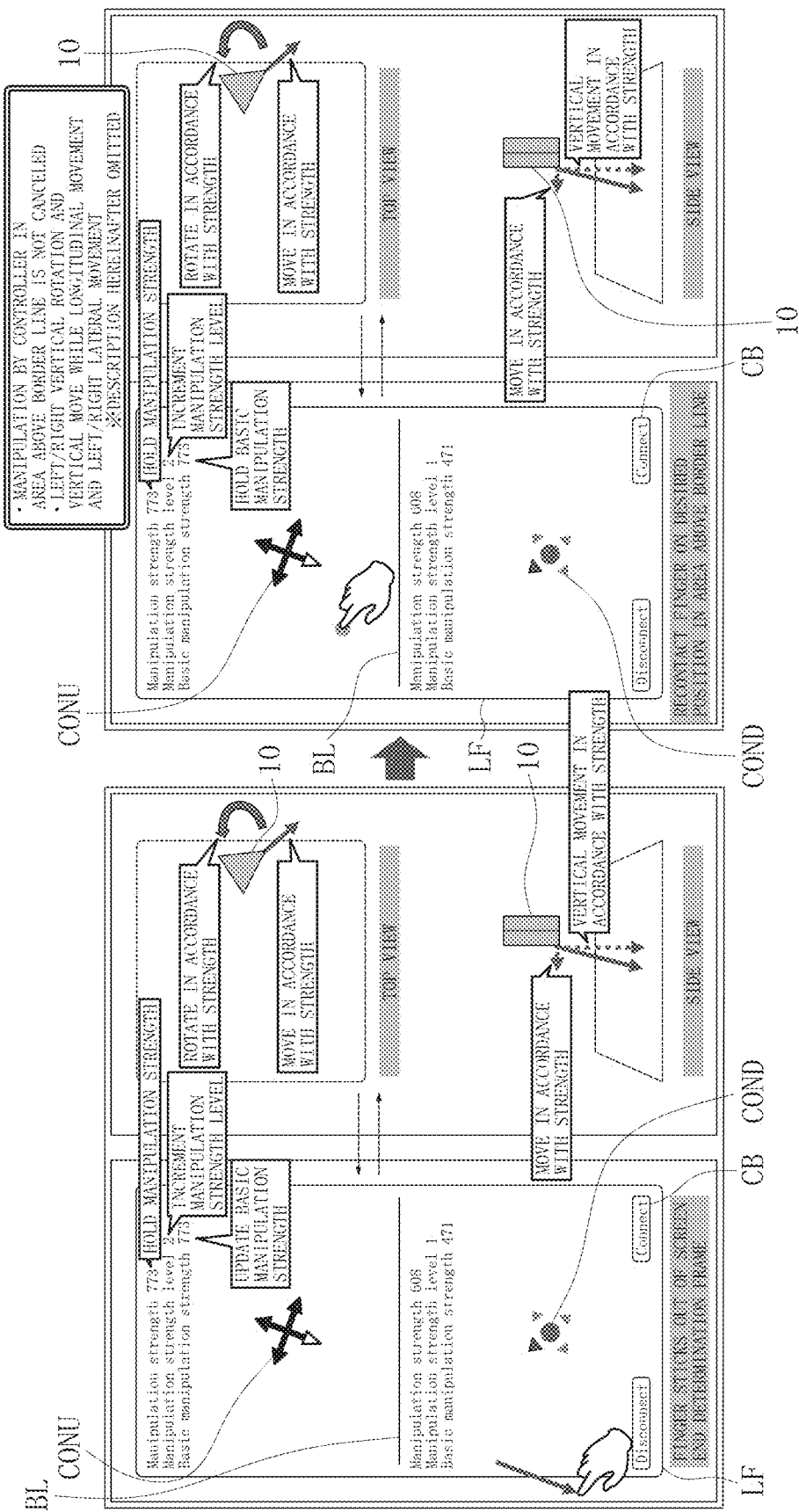

<Example of FIG. 11J: A Finger has Stuck Out of a Screen End Determination Frame; and a Recontact of a Finger on a Desired Position in the Area Above the Border Line BL>

After the figure to the right in FIG. 11I, assume that a finger has stuck out of the left frame LF serving as the screen end determination frame, the "manipulation strength" is held, the "manipulation strength level" is incremented, and the "basic manipulation strength" is updated. The manipulation target device 10 continues to travel on the basis of its "current manipulation information".

As illustrated in the figure to the right in FIG. 11J, in a case where a recontact of a finger has occurred in the area above the border line BL, a manipulation by the controllers CONU and COND for areas above/below the border line BL is not canceled but the manipulation target device 10 continues a travel.

<Operation of Upward Flick>

Assume that the controller 2 has recognized that the manipulation is an upward flick in S203 (S205: upward flick determination means). Upon an upward flick, the controller 2 proceeds to processing in S216 and the subsequent steps. That is, in the case of an upward flick, unlike a swipe, an increase in a "manipulation strength" and a change in a "travel direction" in accordance with a length and a direction of a swipe (S208, S209) do not take place, but processing to increment a "manipulation strength level" takes place.

Figure 14:
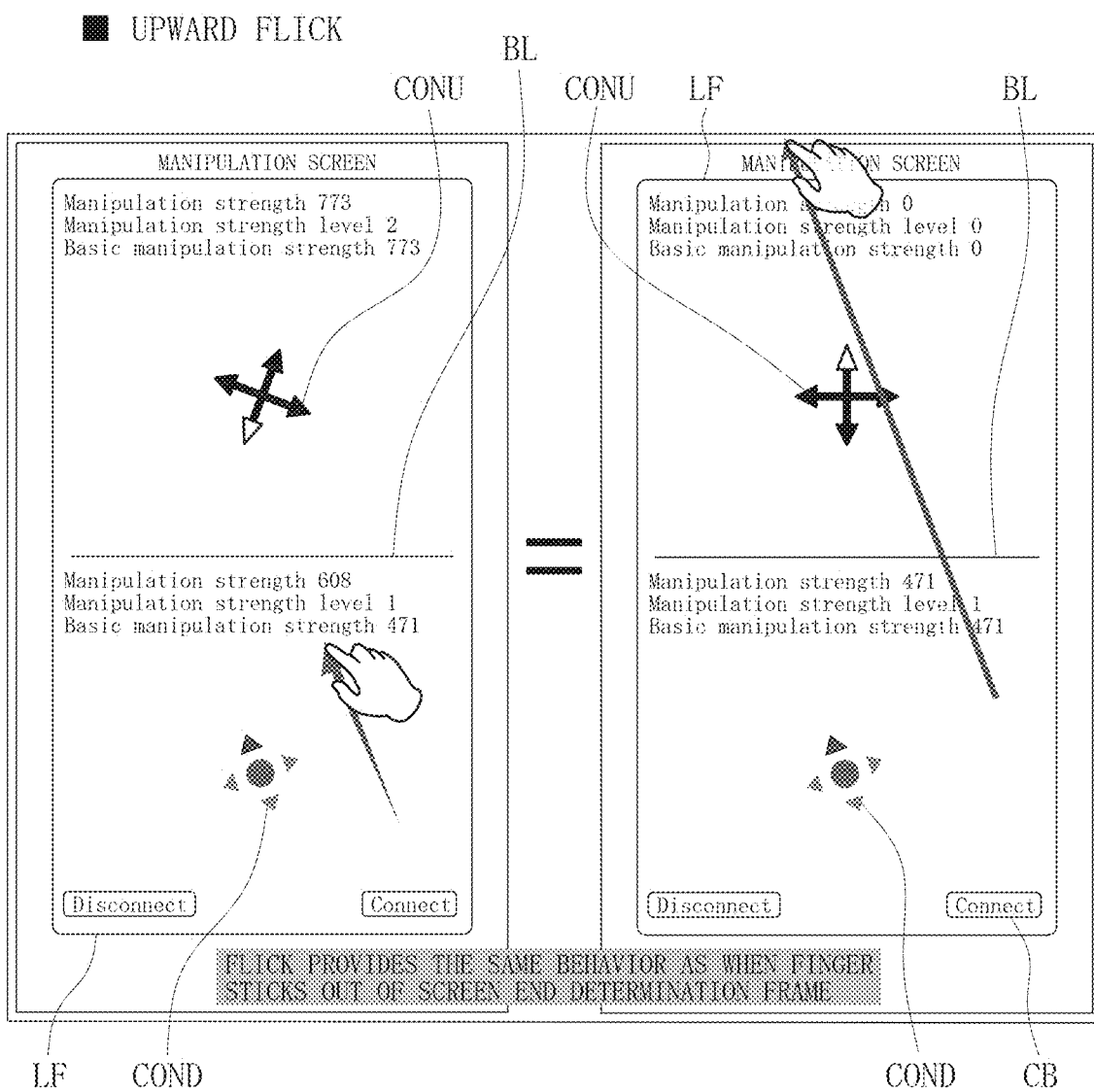
FIG. 14 explains display examples explaining the function of the upward flick.

<Example of FIG. 14: Upward Flick>

As illustrated in the figure to the left in FIG. 14, assume that a flick in an upward direction (upward flick) has occurred in the area below the border line BL. In this case, as illustrated in FIG. 9, an increase in a "manipulation strength" and a change in a "travel direction" (S208, S209) do not take place, but control proceeds to an operation in S216 and the subsequent steps, and the same behavior as in a case where the finger has stuck out of a screen end determination frame takes place. That is, the "manipulation strength" is held, the "manipulation strength level" is incremented by one level, and the "basic manipulation strength" is updated. The manipulation target device 10 continues to travel in accordance with the "manipulation strength" and a travel direction that belong to the held "current manipulation information".

<Operation of Tap or Downward Flick>

Assume that the controller 2 has recognized that the manipulation is a tap or a downward flick in S203 (S206: tap/downward flick determination means). The controller 2 discards the stored current "manipulation strength level" (S221). Next, the controller 2 performs decrement so that a "manipulation strength level" in the "current manipulation information" drops by one level (S222), and updates the "current manipulation information" so that the "basic manipulation strength" stored in a second storage frame corresponding to the "manipulation strength level" after the decrement changes to the "basic manipulation strength" in the "current manipulation information" (S223). The controller 2 then updates the "current manipulation information" so that the "manipulation strength" in the "current manipulation information" becomes the "basic manipulation strength" (S224). The controller 2 holds a "travel direction" in the "current manipulation information" (S225), and waits until a finger touches a desired position in a responsible area.

Processing to decrease the "manipulation strength" of the "current manipulation information" by one level is the "current manipulation information" that have been generated on the basis of a finger that has left the screen.

The target of the process of lowering the "manipulation strength" by one step is the "manipulation strength" of the "current manipulation information" that has been generated based on the finger that has left the contact. That is, the processing is the "current manipulation information" corresponding to the area with which the finger was in contact.

The "current manipulation information" is held even after the finger is lifted up from the screen. Therefore, in a case where a finger has touched the screen again, the manipulation continues from the manipulation performed before the finger is lifted up, by S202 and the subsequent steps, on the basis of the "current manipulation information" that is held. In the case it is determined that the manipulation is not only the tap or a downward flick manipulation, but also any other manipulation (S203), the manipulation continues from the state before the finger is lifted up, which assures an intuitive and excellent operability.

Figure 12:
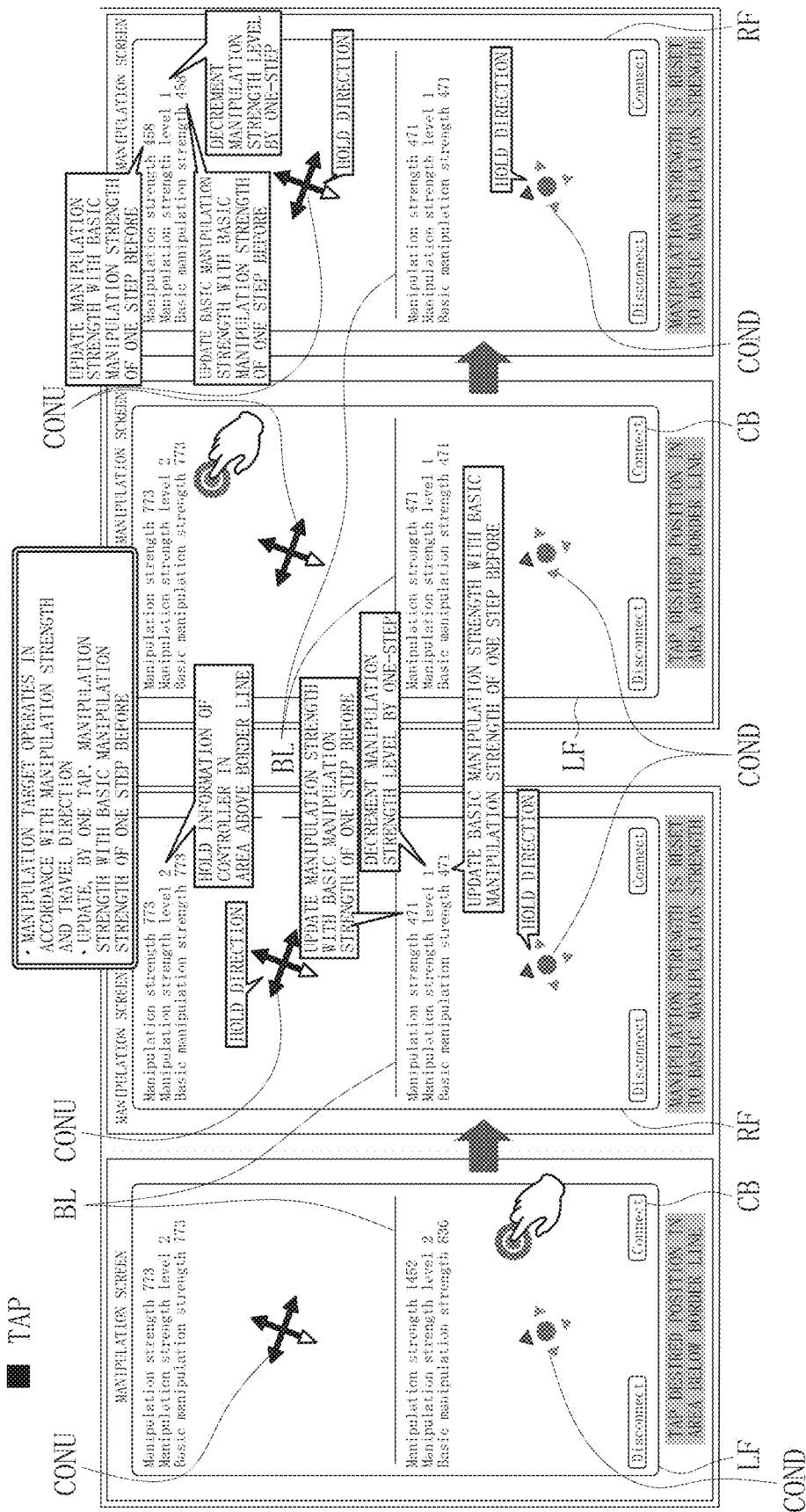
FIG. 12 explains display examples of the screen upon a tap.

<Example of FIG. 12: A Tap>

<Screen Example Upon a Tap or a Downward Flick>

As illustrated in the figure to the left in FIG. 12, assume that a tap has occurred on a desired position in the area below the border line BL. The "manipulation strength" is updated with the "basic manipulation strength" that is one step before, the "manipulation strength level" is decremented, and the "basic manipulation strength" is updated with the "basic manipulation strength" of one-step before. The "travel direction" is held. In this way, the "manipulation strength" is reset to the "basic manipulation strength". Various information and a direction of the controller CONU for the area above a border line BL are held.

As illustrated in the figure to the right in FIG. 12, assume that a tap has occurred on a desired position in the area above the border line BL. The "manipulation strength" is updated with the "basic manipulation strength" of one-step before, the "manipulation strength level" is decremented, and the "basic manipulation strength" is updated to the "basic manipulation strength" of one-step before. The travel direction is held. In this way, the "manipulation strength" is reset to the "basic manipulation strength". Various information and a direction of a controller for the area below a border line are held.

Figure 15:
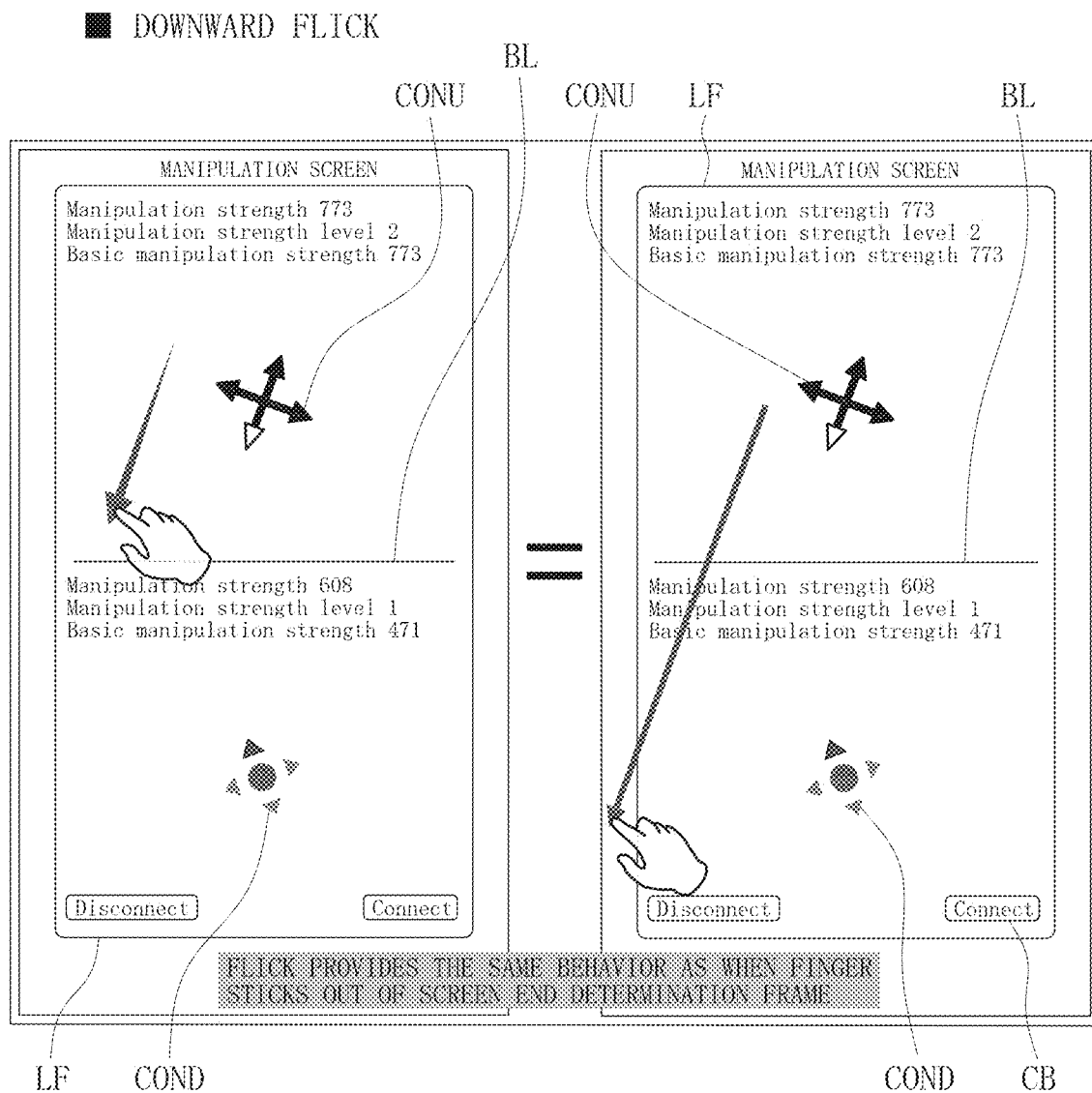
FIG. 15 explains display examples for explaining the function of the downward the downward flick.

<Example of FIG. 15: A Downward Flick>

Basically, a "downward flick" and "a tap" are the same behavior. Note that in a throttle manipulation such as the lift vertical movement and weight vertical movement as in FIG. 15, a swipe in a downward direction means a "travel in the downward direction". The operator may associate a "downward flick" with an increment of a strength, which contradict with a basic behavior in some cases.

A configuration where a "downward flick" and a "tap" are the same behavior for an elevator manipulation and a "downward flick" and "a finger has stuck out of a screen end determination frame during a swipe in a downward direction" are the same behavior for a throttle manipulation may fit the senses of the operator. FIG. 15 illustrates an example of such a case.

<Operation of Double Tap or Press the Stop Button>

By way of a manipulation determination in S203, the controller 2 has recognized a double tap (S207: double tap determination means), or the stop button is pressed (S240: stop button determination means). The controller 2 resets the display of "manipulation strength level" in an image of a virtual controller (S226), the display of "manipulation strength level" (S227), the display of "manipulation strength" (S228), and the display of "travel direction" (S229).

Information discarded by a double tap is information held as manipulation information of the area to which a contact position of a double tap belongs. Once the information is discarded, the information processing device 1 makes a manipulation to stop a travel that belongs to a contact area on the manipulation target device 10.

The information discarded upon a press the stop button is held information that belongs to a predetermined area. Information of all areas may be discarded or information of some areas may be discarded. The information processing device 1, upon a press the stop button, makes a manipulation to stop a travel that belongs to a predetermined area. When all areas are predetermined, the information processing device 1 makes a manipulation to stop the manipulation target device 10 or cause the same to wait on the spot.

The controller 2 discards information stored in a first storage frame and second storage frame at all "manipulation strength levels" (S230), and waits until a finger touches a desired position in a responsible area.

Figure 13A:
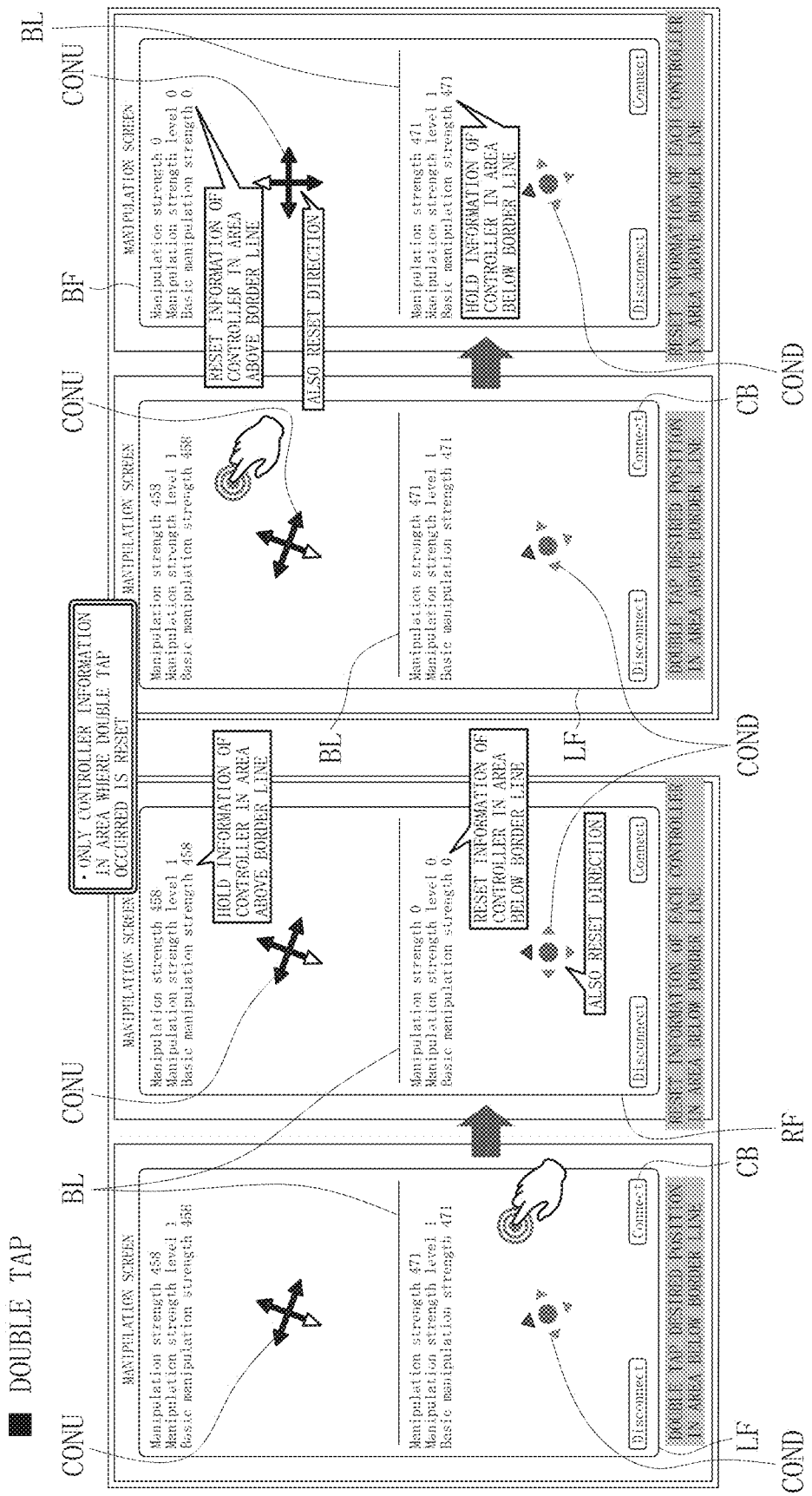
FIGS. 13A and 13B explain display examples the screen upon a double tap.

<Example of FIG. 13A: Double Tap>

Only manipulation information corresponding to a controller for the area where a double tap occurred is reset, and manipulation information corresponding to a controller for other areas is not reset.

As illustrated in the figure to the left in FIG. 13A, upon a double tap on a desired position in the area below a border line, manipulation information of a controller for the area below a border line is reset but manipulation information of a controller for the area above a border line is held.

As illustrated in the figure to the right in FIG. 13A, upon a double tap on a desired position in the area above a border line, manipulation information of a controller for the area above a border line is reset but manipulation information of a controller for the area below a border line is held.

Figure 13B:
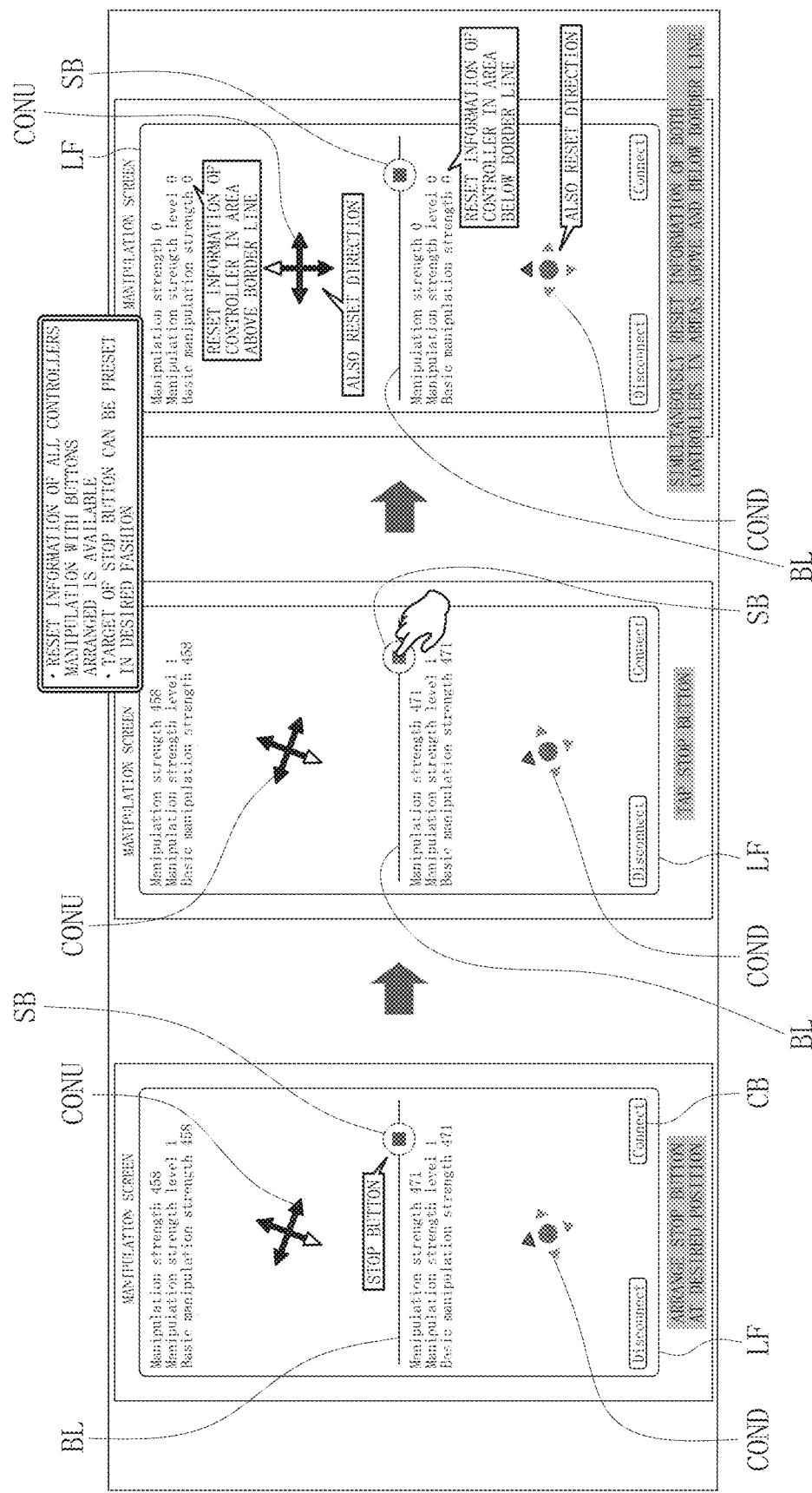

<Example of FIG. 13B: Tap on the Stop Button SB>

As illustrated in FIG. 13B, for example, assume that the stop button SB is arranged on a border line. The stop button SB may be arranged at a desired position.

Upon a tap on the stop button SB, manipulation information of all controllers is reset.

The controller reset by the stop button SB may be preset in a desired manner.

In the example illustrated in FIG. 13B, manipulation information of controllers above/below a border line is simultaneously reset.

As described above, it is understood that the information processing device 1 generates, via an operation in FIG. 9, manipulation information to manipulate manipulation target device 10 on the basis of a contact manipulation by an instruction object on the display device 4, and even in a case where the instruction object is not touching the display device 4, functions as manipulation information generating and holding means for holding manipulation information.

<Manipulation Area and Screen End Determination Frame>

While areas and a screen end determination frame for manipulation are described above, the manipulation areas and screen end determination frame are summarized below.

The information processing device 1 includes, as a manipulation area, the area used to perform a manipulation on the manipulation target device 10, in a display screen of the display device 4. Concerning a range that is equal to or larger than the manipulation area, a predetermined range is defined as a screen end determination frame. The information processing device 1 displays an image of a virtual controller in the manipulation area. In this way, the information processing device 1 includes, as a manipulation area, the area used to perform a manipulation on the manipulation target device 10, in the display screen of the display device 4, and functions as virtual controller image display means for causing the display device 4 to display an image of a virtual controller while using a predetermined range on the display device 4 as a screen end determination frame.

The information processing device 1 generates manipulation information until a screen end determination frame is reached, even in a case where a manipulation has started from a manipulation area and has stuck out of the manipulation area.

The information processing device 1, in a case where functioning as the virtual controller image display means, may be divided into a first area for performing a first manipulation on the manipulation target device 10, as illustrated in the drone manipulation (rudder and elevator in the case of a drone illustrated above), and a second area for performing a second manipulation on the manipulation target device 10 (aileron and throttle in the case of a drone illustrated above).

The information processing device 1, in a case where functioning as the manipulation information generating and holding means, generates manipulation information used for the first manipulation on the basis of the manipulation by an instruction object in the first area, and manipulation information used for the second manipulation on the basis of the manipulation by an instruction object in the second area, and holds both types of information.

As illustrated in FIG. 16, as long as a finger remains touching on the screen, a controller for the area including a first contact position shall be in charge of manipulation. In the figure to the left in FIG. 16, the finger has touched the area above a border line, so that a controller for the area above a border line is in charge of manipulation. In this case, the virtual manipulation screen (finger travel range) extends to the area below a border line.

Referring to the figure to the left in FIG. 16, a finger has touched the area below a border line, so that a controller for the area below a border line is in charge of manipulation. In this case, the virtual manipulation screen (finger travel range) extends to the area above a border line.

The screen end determination frame is an end of the virtual manipulation screen illustrated in FIG. 16.

APPLICATION EXAMPLE

Application examples are illustrated in FIGS. 17A to 17E.

As illustrated in FIG. 17A, it is possible to arrange controllers each having a different "manipulation characteristic" in a wide screen. For example, a single terminal can offer a variety of manipulations from an extremely minute manipulation to an ultrafast manipulation. A controller in FIG. 17A, for example, is capable of causing a manipulation target to rapidly approach a destination and then perform high-precision adjustment.

As illustrated in FIG. 17B, controllers CON for manipulating a plurality of "manipulation target objects (devices, parts, areas, information and so on)" can be arranged in a wide screen. For example, a plurality of objects such as Arm A, Arm B, Arm C on deep sea exploration equipment, telesurgery equipment, and the like, can be manipulated by a single terminal. For example, concerning robots such as a humanoid robot and a rescue robot, a plurality of actions such as a change in the point of view, the travel, vertical rotation and balancing can be extensively manipulated by a single terminal.

Figure 17C:
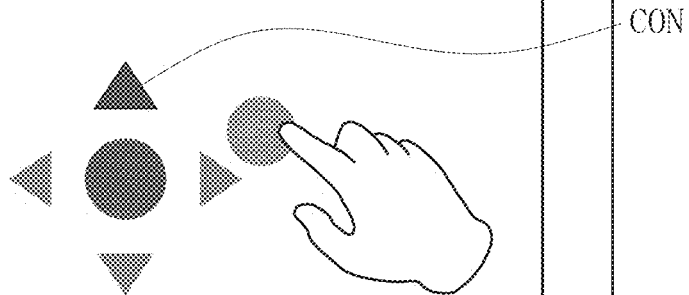

As illustrated in FIG. 17C, by introducing a more minute increment value of the "manipulation strength" of a controller CON, extremely high precision manipulation is available.

As illustrated in FIG. 17D, by adjusting the manipulation unit via a controller CONL on the left side and by performing manipulation via a controller CONR on the right side, manipulation while adjusting the unit of the "manipulation strength" is available. By increasing a touch determination points, simultaneous multiple manipulations are available.

Figure 17E:
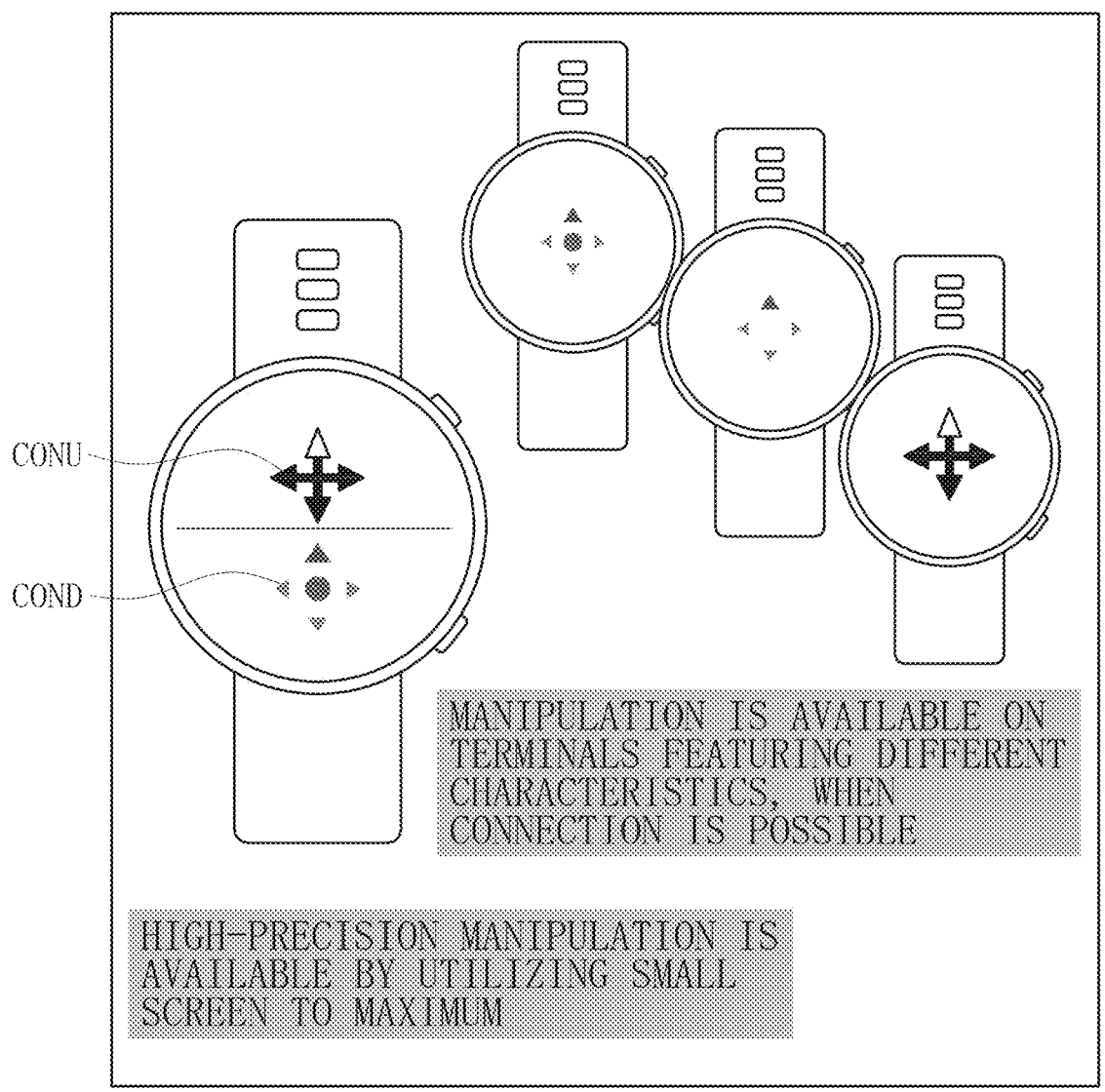

As illustrated in FIG. 17E, maximum utilization of a small screen offers high-precision manipulation. When connection is available, manipulation on a plurality of terminals having different characteristics is available.

While not illustrated here, assuming that the manipulation target device 10 includes a plurality of units and a controller may be assigned to each unit, and then the plurality of units may be manipulated from a single terminal.

<Versatility>

Figure 18:
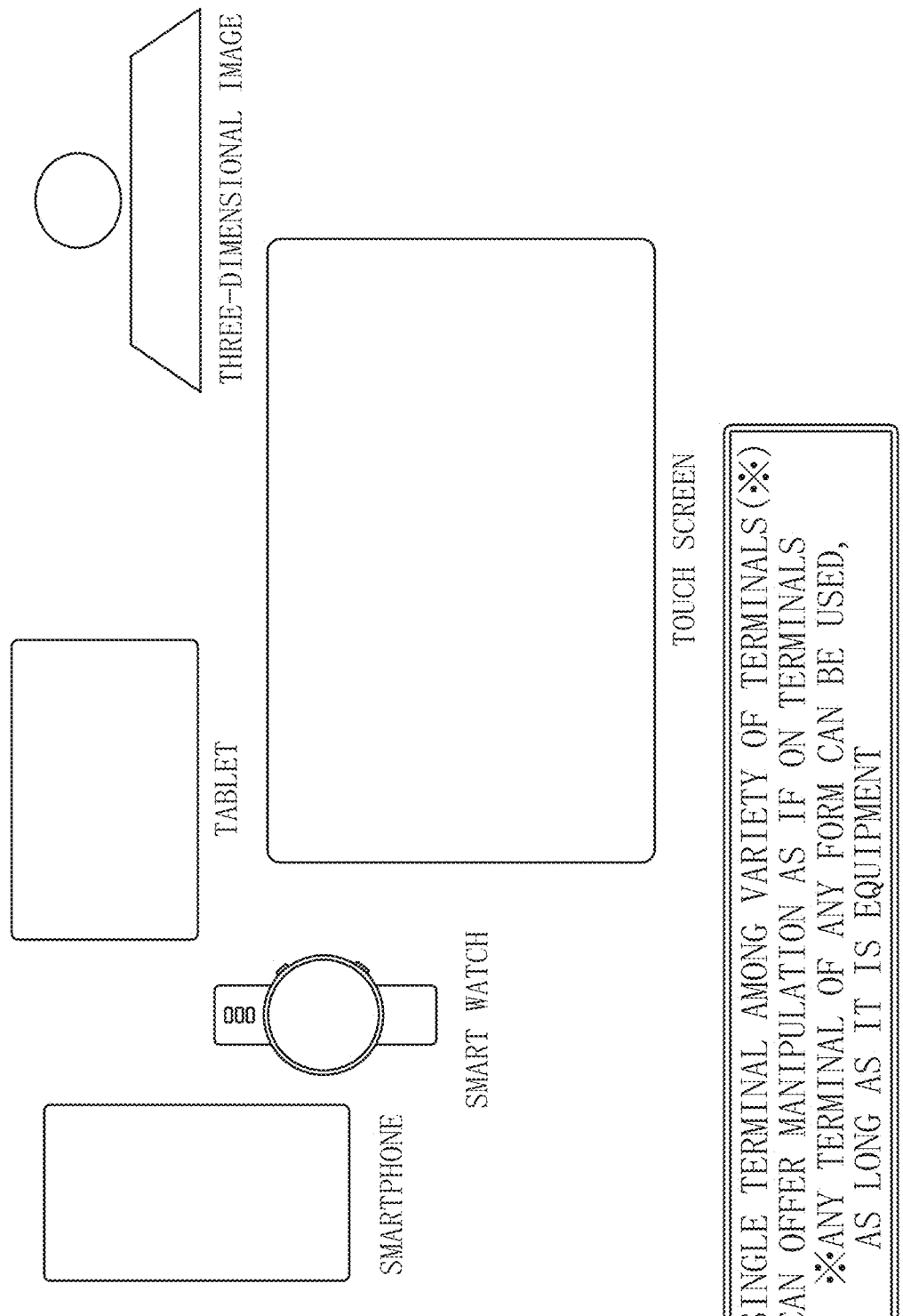
FIG. 18 explains a versatility of the disclosure.

As illustrated in FIG. 18, terminals to be used include a variety of terminals such as a smartphone, a smart watch, a tablet, a touch screen, and a three-dimensional image. A single terminal among a variety of terminals can offer a manipulation as if on a plurality of terminals. Any terminal of any form can be used, as long as it is equipment operable by touching a controller displayed by a program.

<Number of Manipulation Target Device>

While a single manipulation target device is used in the foregoing embodiment, a plurality of manipulation target devices may be controlled by using a plurality of controllers. In that case, the information processing device 1 preferably transmits manipulation information obtained by a controller to a corresponding manipulation target device and the other operations preferably use any technology described in the foregoing embodiment.

<Type of Manipulation Target Device>

While in the foregoing embodiment, the manipulation target device 10 is described basically as a drone, the manipulation target device 10 is not limited to a drone. Any type of manipulation target device is within the scope of the disclosure as long as manipulation information input to a controller is transmitted to the manipulation target device in accordance with the manipulation target device.

(Variant)

In the above embodiment presented in FIG. 9, it is outside the range of determination in which direction, upward, downward, or any other direction a finger is lifted up from the screen end determination frame. However, depending on a particular manipulation target device 10, a reduced manipulation speed when a swipe occurs in the downward direction and the finger is lifted up from the screen end determination frame may suit the sense of the operator in some cases.

When the finger has inadvertently moved out of the screen end determination frame in an attempt to decrement the "manipulation strength level" via a downward flick, the "manipulation strength level" is incremented against the intent of the operator in the embodiment illustrated in FIG. 9, which may result in a manipulation just converse to a sense-based manipulation.

There are personal differences in sense about a flick manipulation, which has a considerable influence on good or poor operability.

Assume that the operator has made a tap to decrement (for example, reduce the speed of) the "manipulation strength level" in an environment where a button such as the Pose Button is arranged in the screen. When the Pose Button is arranged at the position of a tap made by the operator to reduce the speed while he/she is absorbed in the manipulation, a pose manipulation may take place against the operator's intent of speed reduction. In this way, in the case of decrementing the "manipulation strength level" via a tap may result in a manipulation that is against the operator's intent.

In the above embodiment illustrated in FIG. 9, when the "manipulation strength level" is wished to increase, a swipe is made and the finger is lifted outside the screen end determination frame, or an upward flick is made. To decrease the "manipulation strength level", a tap or a downward flick is made.

As mentioned above, from the standpoint of a sense-based manipulation, operability may be improved when it is possible to decrease the "manipulation strength level" by lifting the finger outside the screen end determination frame by way of a swipe in the downward direction. Considering a possible error in a tap or a downward flick manipulation, such a manipulation is effective.

The information processing device 1 preferably determines, in a case where the finger is lifted up during a swipe outside the screen end determination frame, whether or not the travel direction of the finger that is lifted up is a predetermined downward direction.

The predetermined downward direction need not be a downward direction that is completely parallel to a side of the screen but refers to a downward direction within a range of a predetermined angle.

In a case where the finger is lifted up outside the screen end determination frame in a direction other than the downward direction, the information processing device 1 proceeds to processing in S216 and the subsequent steps and increments the "manipulation strength level" by one level. On the other hand, in a case where the finger is lifted in the predetermined downward direction, the information processing device 1, as in a tap or downward flick manipulation, proceeds to processing in S221 and the subsequent steps and decrements the "manipulation strength level" by one level.

The above one-level increment or one-level decrement is related to the strength of the "current manipulation information" generated by the finger in contact that was then lifted up.

In this way, in a case where a swipe occurs in the downward direction and the finger is lifted up outside the screen end determination frame, control proceeds to the processing in S221 and the subsequent steps, with the "manipulation strength level" decremented by one level, and the "current manipulation information" is updated to the "manipulation strength" corresponding to the decremented "manipulation strength level".

For other topics, the increment or decrement processing of the "manipulation strength" is preferably changed, as appropriate, in accordance with the characteristics, manipulation environment or the like of a manipulation target.

For example, in a case where the finger is lifted up outside the screen end determination frame, whether a swipe manipulation is in the upward direction, in the rightward direction, in the leftward direction, or in the downward direction, on all or some of which a determination is preferably made, and the "manipulation strength" increment/decrement manipulation of the "manipulation strength" is preferably executed in accordance the direction of the swipe manipulation.

According to the above variant, the strength is decremented by one level when the finger is lifted up outside the screen end determination frame during a swipe in the downward direction. This offers a manipulation that fits the sense of the operator.

In the above embodiment, the display (touch panel) 4 detects the position of the instruction object when it physically contact or touch with the display screen and determines that the instruction object is left from the display screen when it cannot detect the position of the instruction object. The display is not limited to this type. For example, there are displays which can detect the position of the instruction object even when it is apart from the display screen in short distance. This types of displays or touch panel can be used. In this case, the display determines the instruction object is in contact with the screen when it detect the position of the instruction object, and determines the instruction object is apart from the screen when it cannot detect the position of the instruction object. Further, the display 4 is tangible one. The display 4 may be a virtual touch panel which is project in a space with, for example, laser beams. In this case, the device determines the instruction object is in touch with the screen when the instruction object is within a predetermined space area around a virtual screen projected in a space, and determines the instruction object is apart from the virtual screen when the instruction object is out of the predetermined space area around the virtual screen.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The disclosure pertains to a program for manipulating a manipulation target device and is industrially applicable.

1 Information processing device
2 Controller
3 Storage
4 Display device
4a Display
4b Manipulation inputter
5 Communicator
6 Inputter
10 Manipulation target device
11 Drive
12 Controller
13 Storage
15 Communicator

The invention claimed is:

1. A non-transitory computer readable medium storing a program for manipulating a manipulation target device including a drive device, the program causing a computer, that is to be connected to a display device that accepts a contact manipulation by an instruction object or that includes the display device that accepts the contact manipulation by the instruction object, to function as manipulation information generating and holding means for generating manipulation information for manipulation of the manipulation target device on basis of the contact manipulation by the instruction object on the display device, and holding the manipulation information even when the instruction object is not touching the display device, and manipulation means for manipulating the manipulation target device by transmitting the held manipulation information to the manipulation target device, wherein the manipulation information generating and holding means determines whether or not a contact on the display device is lost during a swipe, when determining that a contact on the display device is lost during a swipe, holds current manipulation information on the manipulation target device, the manipulation means transmits the held current manipulation information to the manipulation target device and manipulates the manipulation target device even in a state where the contact on the display device is not made, and the manipulation information generating and holding means restarts generation of the manipulation information on basis of the held current manipulation information when a new contact on the display device is made again, wherein the program further causes the computer to function as virtual controller image display means for causing the display device to display an image of a virtual controller at least by separating the image into a first area for performing a first manipulation on the manipulation target device and a second area for performing a second manipulation on the manipulation target device, and the manipulation information generating and holding means generates manipulation information for the first manipulation on basis of a manipulation by the instruction object in the first area and generates manipulation information for the second manipulation on basis of a manipulation by the instruction object in the second area, wherein the manipulation information generating and holding means generates, as the manipulation in the first area, the manipulation information even when the manipulation by the instruction object starts from the first area and the manipulation by the instruction object sticks out of the first area and reaches the second area.

2. The non-transitory computer readable medium storing the program according to claim 1, wherein
the program further causes the computer to function as virtual controller image display means for causing the display device to display the image of the virtual controller by setting an area for performing a manipulation on the manipulation target device as a manipulation area and a predetermined range on the display device as a screen end determination frame, in a display screen of the display device, and
the manipulation information generating and holding means generates the manipulation information until the screen end determination frame is reached even when the manipulation by the instruction object starts from the manipulation area in either the first area or the second area and sticks out of the manipulation area.

3. The non-transitory computer readable medium storing the program according to claim 1, wherein
the program further causes the computer to function as double tap determination means for determining whether or not a manipulation on the display device is the double tap,
the manipulation information generating and holding means, when determining the double tap, discards information held as manipulation information in an area to which a contact position belongs, and
the manipulation means performs the manipulation to stop a travel that belongs to a contact area on the manipulation target device.

4. The non-transitory computer readable medium storing the program according to claim 1, wherein
the program further causes the computer to function as stop button determination means for determining whether a manipulation on the display device is a press of a stop button,
the manipulation information generating and holding means, when determining the press of the stop button, executes a stop instruction in a predetermined area, and discards held information that belongs to respective areas, and
the manipulation means performs the manipulation to stop a travel that belongs to the predetermined area, or when all areas are predetermined, performs the manipulation to stop the manipulation target device or to cause the manipulation target device to wait on a spot where manipulation target device is located.

5. The non-transitory computer readable medium storing the program according to claim 1, wherein the manipulation information generating and holding means generates the manipulation information on basis of a two-dimensional vector of a swipe by the instruction object on the display device.

6. The non-transitory computer readable medium storing the program according to claim 5, wherein the manipulation information generating and holding means generates the manipulation information on basis of an x component and a y component of the two-dimensional vector.

7. The non-transitory computer readable medium storing the program according to claim 6, wherein when the manipulation target device is a drone, the manipulation information generating and holding means generates the manipulation information so that a direction and a strength of two manipulations out of a rudder, an elevator, an aileron or a throttle are indicated by the x component and the y component respectively.

8. The non-transitory computer readable medium storing the program according to claim 7, wherein when the manipulation target device is the drone, the manipulation information generating and holding means generates the manipulation information so that the direction and the strength of the manipulations except the two manipulations out of the rudder, the elevator, the aileron or the throttle are indicated by the x component and the y component.

9. The non-transitory computer readable medium storing the program according to claim 1, wherein
the program further causes the computer to function as virtual controller image display means for displaying, when the manipulation target device is a drone, the image of the virtual controller on the display device by separating the image into the first area for performing two manipulations out of a rudder, an elevator, an aileron or a throttle, and the second area for performing the two manipulations except the two manipulations in the first area, and
the manipulation information generating and holding means generates manipulation information in the first area on basis of a swipe manipulation by the instruction object in the first area and generates manipulation information in the second area on basis of a swipe manipulation by the instruction object in the second area.

10. A non-transitory computer readable medium storing a program for manipulating a manipulation target device including a drive device, the program causing a computer, that is to be connected to a display device that accepts a contact manipulation by an instruction object or that includes a display device that accepts a contact manipulation by an instruction object, to function as
manipulation information generating and holding means for generating manipulation information for manipulation of the manipulation target device on basis of the contact manipulation by the instruction object on the display device, and holding the manipulation information even when the instruction object is not touching the display device, and
manipulation means for manipulating the manipulation target device by transmitting the held manipulation information to the manipulation target device,
wherein
the manipulation information generating and holding means
determines whether or not a contact on the display device is lost during a swipe,
when determining that a contact on the display device is lost during a swipe, holds current manipulation information on the manipulation target device,
the manipulation means transmits the held current manipulation information to the manipulation target device and manipulates the manipulation target device even in a state where the contact on the display device is not made, and
the manipulation information generating and holding means restarts generation of the manipulation information on basis of the held current manipulation information when a new contact on the display device is made again, wherein
the manipulation information generating and holding means, when determining that the contact of the instruction object is lost outside a predetermined screen end determination frame, updates the current manipulation information as manipulation information of one-level higher strength,
the manipulation means manipulates the manipulation target device on basis of the updated current manipulation information in a state where the contact on the manipulation inputter display device is not made, and
the manipulation means restarts, when a new contact on the display device is made again, a manipulation of the manipulation target device on basis of the current manipulation information held as manipulation information in an area to which a contact position belongs.

11. A non-transitory computer readable medium storing a program for manipulating a manipulation target device including a drive device, the program causing a computer, that is to be connected to a display device that accepts a contact manipulation by an instruction object or that includes a display device that accepts a contact manipulation by an instruction object, to function as
manipulation information generating and holding means for generating manipulation information for manipulation of the manipulation target device on basis of the contact manipulation by the instruction object on the display device, and holding the manipulation information even when the instruction object is not touching the display device, and
manipulation means for manipulating the manipulation target device by transmitting the held manipulation information to the manipulation target device,
wherein
the manipulation information generating and holding means
determines whether or not a contact on the display device is lost during a swipe,
when determining that a contact on the display device is lost during a swipe, holds current manipulation information on the manipulation target device,
the manipulation means transmits the held current manipulation information to the manipulation target device and manipulates the manipulation target device even in a state where the contact on the display device is not made, and
the manipulation information generating and holding means restarts generation of the manipulation information on basis of the held current manipulation information when a new contact on the display device is made again,
wherein
the manipulation information generating and holding means is, when determining that the contact is lost outside a predetermined screen end determination frame, and when a travel direction upon the loss of contact is a predetermined downward direction, capable of updating, as manipulation information of one-level lower strength, the current manipulation information generated on basis of the instruction object whose contact is lost,
the manipulation means manipulates the manipulation target device on basis of the updated current manipulation information, in a state where the contact on the display device is not made, and
the manipulation means restarts, when a new contact on the display device is made again, a manipulation of the manipulation target device on basis of the current manipulation information held as manipulation information in an area to which a contact position belongs.

12. A non-transitory computer readable medium storing a program for manipulating a manipulation target device including a drive device, the program causing a computer, that is to be connected to a display device that accepts a contact manipulation by an instruction object or that includes a display device that accepts a contact manipulation by an instruction object, to function as
manipulation information generating and holding means for generating manipulation information for manipulation of the manipulation target device on basis of the contact manipulation by the instruction object on the display device, and holding the manipulation information even when the instruction object is not touching the display device, and
manipulation means for manipulating the manipulation target device by transmitting the held manipulation information to the manipulation target device,
wherein
the manipulation information generating and holding means
determines whether or not a contact on the display device is lost during a swipe,
when determining that a contact on the display device is lost during a swipe, holds current manipulation information on the manipulation target device,
the manipulation means transmits the held current manipulation information to the manipulation target device and manipulates the manipulation target device even in a state where the contact on the display device is not made, and
the manipulation information generating and holding means restarts generation of the manipulation information on basis of the held current manipulation information when a new contact on the display device is made again,
wherein
the program further causes the computer to function as upward flick determination means for determining whether or not a manipulation on the display device is a predetermined upward flick,
the manipulation information generating and holding means, when the determination means determines that the manipulation is the predetermined upward flick in a predetermined upward direction, updates the current manipulation information as manipulation information of one-level higher strength,
the manipulation means manipulates the manipulation target device on basis of the updated current manipulation information in a state where the contact on the display device is not made, and
the manipulation means restarts, when a new contact on the display device is made again, a manipulation of the manipulation target device on basis of the current manipulation information held as manipulation information in an area to which a contact position belongs.

13. A non-transitory computer readable medium storing a program for manipulating a manipulation target device including a drive device, the program causing a computer, that is to be connected to a display device that accepts a contact manipulation by an instruction object or that includes a display device that accepts a contact manipulation by an instruction object, to function as
manipulation information generating and holding means for generating manipulation information for manipulation of the manipulation target device on basis of the contact manipulation by the instruction object on the display device, and holding the manipulation information even when the instruction object is not touching the display device, and manipulation means for manipulating the manipulation target device by transmitting the held manipulation information to the manipulation target device, wherein the manipulation information generating and holding means determines whether or not a contact on the display device is lost during a swipe, when determining that a contact on the display device is lost during a swipe, holds current manipulation information on the manipulation target device, the manipulation means transmits the held current manipulation information to the manipulation target device and manipulates the manipulation target device even in a state where the contact on the display device is not made, and the manipulation information generating and holding means restarts generation of the manipulation information on basis of the held current manipulation information when a new contact on the display device is made again, wherein the program further causes the computer to function as tap/downward flick determination means for determining whether or not a manipulation on the display device is the tap or the predetermined downward flick, the manipulation information generating and holding means, when determining the tap or the flick in a predetermined downward direction, updates the current manipulation information generated on basis of the instruction object whose contact is lost as manipulation information of one-level lower strength, the manipulation means manipulates the manipulation target device on basis of the updated current manipulation information in a state where the contact on the display device is not made, and the manipulation means restarts, when a new contact on the display device is made again, the manipulation of the manipulation target device on basis of the current manipulation information held as manipulation information in an area to which a contact position belongs.

* * * * *